(12) United States Patent
Chen et al.

(10) Patent No.: US 10,014,982 B1
(45) Date of Patent: *Jul. 3, 2018

(54) TIME-REVERSAL TECHNOLOGIES FOR HYBRID WIRELESS NETWORKS

(71) Applicant: Origin Wireless, Inc., Boston, MA (US)

(72) Inventors: Yan Chen, ChengDu (CN); Hang Ma, Greenbelt, MD (US); Yi Han, Greenbelt, MD (US); Hung-Quoc Duc Lai, Parkville, MD (US); K. J. Ray Liu, Potomac, MD (US)

(73) Assignee: Origin Wireless, Inc., Greenbelt, MD (US)

(*) Notice: Subject to any disclaimer, the term of this patent is extended or adjusted under 35 U.S.C. 154(b) by 121 days.

This patent is subject to a terminal disclaimer.

(21) Appl. No.: 15/004,314

(22) Filed: Jan. 22, 2016

Related U.S. Application Data

(60) Provisional application No. 62/106,395, filed on Jan. 22, 2015.

(51) Int. Cl.
*H04W 4/00* (2018.01)
*H04L 1/06* (2006.01)
(Continued)

(52) U.S. Cl.
CPC ........... *H04L 1/0625* (2013.01); *H04W 24/02* (2013.01); *H04W 28/0268* (2013.01); *H04W 88/10* (2013.01)

(58) Field of Classification Search
None
See application file for complete search history.

(56) References Cited

U.S. PATENT DOCUMENTS 2,933,702 A    4/1960  Bogert
3,767,855 A   10/1973  Ueno et al.
(Continued)

FOREIGN PATENT DOCUMENTS

EP   2 571 214 A1     11/2012
WO   WO 2007/031088    3/2007
(Continued)

OTHER PUBLICATIONS

U.S. Appl. No. 13/706,342, filed Dec. 5, 2012, Yang et al.
(Continued)

*Primary Examiner* — Anh-Vu Ly
(74) *Attorney, Agent, or Firm* — Fish & Richardson P.C.

(57) ABSTRACT

Transmitters and receivers for use in hybrid networks capable of supporting time-reversal division multi-access communication protocols are described. Wireless access points include a wireless receiver for receiving a wireless channel probe signal from a device and a wireless transmitter capable of supporting a time-reversal division multi-access (TRDMA) protocol and at least one other wireless communication protocol. A controller is used to control the operation of the wireless transmitter. Wireless terminal devices include a wireless transmitter for transmitting a wireless channel probe signal and a wireless receiver capable of supporting a TRDMA protocol and at least one other wireless communication protocol. A controller is used to control the operation of the wireless receiver. An example of the at least one other wireless communication protocol that may be supported is OFDMA. Network performance can be improved by using wireless access points and terminal devices that switch between supporting one wireless communication protocol or another or supporting multiple wireless communication protocols simultaneously.

20 Claims, 22 Drawing Sheets

(51) Int. Cl.
*H04W 24/02* (2009.01)
*H04W 28/02* (2009.01)
*H04W 88/10* (2009.01)

(56) References Cited

U.S. PATENT DOCUMENTS

| | | | |
|---|---|---|---|
| 5,092,336 | A | 3/1992 | Fink |
| 5,155,742 | A | 10/1992 | Ariyavisitakul et al. |
| 5,428,999 | A | 7/1995 | Fink |
| 5,926,768 | A | 7/1999 | Lewiner et al. |
| 6,301,291 | B1 | 10/2001 | Rouphael et al. |
| 6,490,469 | B2 | 12/2002 | Candy |
| 6,862,326 | B1 | 3/2005 | Eran et al. |
| 7,362,815 | B2 | 4/2008 | Lindskog et al. |
| 7,440,766 | B1 | 10/2008 | Tuovinen et al. |
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 | 6/2012 | Zhang et al. |
| 8,346,197 | B2 | 1/2013 | Huy et al. |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,547,912 | B1* | 10/2013 | Breau ............... H04W 8/26 370/329 |
| 8,593,998 | B2 | 11/2013 | Huy et al. |
| 8,630,604 | B2* | 1/2014 | Kung ............... H04W 36/0005 455/331 |
| 8,743,976 | B2 | 6/2014 | Smith et al. |
| 8,792,396 | B2 | 7/2014 | Huy et al. |
| 8,831,164 | B2 | 9/2014 | Lu |
| 9,226,304 | B2 | 12/2015 | Chen et al. |
| 9,313,020 | B2 | 4/2016 | Ma et al. |
| 2003/0138053 | A1 | 7/2003 | Candy et al. |
| 2004/0156443 | A1 | 8/2004 | Dent |
| 2006/0098746 | A1 | 5/2006 | Candy et al. |
| 2006/0115031 | A1 | 6/2006 | Lindskog et al. |
| 2010/0302977 | A1 | 12/2010 | Huy et al. |
| 2010/0309829 | A1 | 12/2010 | Huy et al. |
| 2012/0155515 | A1 | 6/2012 | Smith et al. |
| 2012/0183037 | A1 | 7/2012 | Allpress et al. |
| 2012/0207234 | A1 | 8/2012 | De Rosny et al. |
| 2012/0257660 | A1 | 10/2012 | Smith et al. |
| 2012/0263056 | A1 | 10/2012 | Smith et al. |
| 2012/0328037 | A1 | 12/2012 | Hsu et al. |
| 2013/0201958 | A1* | 8/2013 | Phan Huy ........... H04B 7/0413 370/329 |
| 2013/0223503 | A1 | 8/2013 | Smith et al. |
| 2014/0022128 | A1 | 1/2014 | Smith |
| 2014/0126567 | A1 | 5/2014 | Husain et al. |
| 2014/0185596 | A1* | 7/2014 | Han .................. H04B 1/7163 370/337 |
| 2015/0049745 | A1* | 2/2015 | Han .................. H04L 25/03343 370/337 |
| 2015/0049792 | A1* | 2/2015 | Han .................. H04L 25/03012 375/219 |
| 2015/0223243 | A1* | 8/2015 | Tabet ................. H04W 28/085 370/330 |
| 2015/0236848 | A1* | 8/2015 | Ma .................... H04L 7/042 370/328 |
| 2015/0257167 | A1* | 9/2015 | Chen ................. H04W 72/085 370/330 |
| 2015/0280796 | A1* | 10/2015 | Yen .................... H04B 7/0421 370/294 |
| 2015/0312081 | A1* | 10/2015 | Yang .................. H04B 1/38 375/298 |
| 2015/0381327 | A1* | 12/2015 | Ashikhmin ......... H04B 7/0452 370/329 |
| 2016/0018508 | A1* | 1/2016 | Chen .................. G01S 5/0252 455/456.1 |
| 2016/0021670 | A1* | 1/2016 | Yang .................. H04L 5/0005 370/330 |
| 2016/0081060 | A1 | 3/2016 | Chen et al. |
| 2016/0164669 | A1* | 6/2016 | Ma .................... H04L 7/042 370/328 |
| 2016/0316454 | A1* | 10/2016 | Chen .................. H04W 72/085 370/328 |
| 2017/0156123 | A1* | 6/2017 | Smith ................. H04W 56/0015 370/328 |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

Abbasi-Moghadam, D. and V.T. Vakili, "A SIMO one-bit time reversal for UWB communication systems", EURASIP J. Wireless Comm. and Networking, 2012:113, 2012.

Albert, D., L. Liu, M. L. Moran, "Time Reversal processing for source location in an urban environment (L)", J. Acoust. Soc. Am., vol. 118, No. 2, pp. 616-619, Aug. 2005.

Biysev, A.P., L.M. Krutyanskii, V'L. Preobrazhenskii, "Wave Phase Conjugation in ultrasonic beams", Physics-Uspekhi, vol. 41, No. 8, pp. 793-805, 1998.

Chang, Y.H., S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.

Chen, Y. et al., "Time-reversal wideband communications," IEEE Signal Processing Letters, vol. 20(12):1219-1222 (Dec. 2013).

Chen, Y., F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.

Daniels et al., "Improving on Time-reversal with MISO Precoding," Proceedings of the Eighth International Symposium on Wireless Personal Communications Conference, Aalborg, Denmark, 5 pages, 2005.

Daniels, R.C. and R. W. Heath, "MISO precoding for temporal and spatial focusing" in the Proceedings of the Eighth International Symposium on Wireless Personal Communications Conference, Aalborg, Denmark, 2005.

De Rosny, J., G. Lerosey and M. Fink, "Theory of Electromagnetic Time-Reversal Mirrors", IEEE Trans. Antennas Propag., vol. 58, No. 10, pp. 3139-3149, Oct. 2010.

Derode, A., A. Tourin, and M. Fink, "Ultrasonic pulse compression with one-bit time reversal through multiple scattering", J. Appl. Phys., vol. 85, No. 9, pp. 6343-6352, May 1999.

Derode, A., A. Tourin, J. de Rosny, M. Tanter, S. Yon, and M. Fink, "Taking Advantage of Multiple Scattering to Communicate with Time-Reversal Antennas", Phys. Rev. Lett., vol. 90, No. 1, 014301, Jan. 2003.

Derode, A., P. Roux, and M. Fink, "Robust Acoustic Time Reversal and High-Order Multiple Scattering", Phys. Rev. Lett., vol. 75, No. 23, pp. 4206-4210, Dec. 1995.

Dorme, C. and M. Fink, "Focusing in transmit-receive mode through inhomogeneous media: The time reversal matched filter approach", J. Acoust. Soc. Am., vol. 98, Pt. 1, pp. 1155-1162, Aug. 1995.

Edelmann, G.F., Akal, T., Hodgkiss, W. S., Kim, S., Kuperman, W. A., Song, H. C., "An Initial Demonstration of Underwater Acoustic Communication Using Time Reversal", IEEE Journal of Oceanic Engineering, vol. 27, No. 3, Jul. 2002.

Emami et al., "Matched Filtering with Rate Back-off for Low Complexity Communications in Very Large Delay Spread Channels," 38th Asilomar Conference on Signals, Systems and Computers, pp. 218-222, 2004.

Emami, S.M., J. Hansen, A.D. Kim, G. Papanicolaou, A.J. Paulraj, D. Cheung, C. Prettie, "Predicted Time Reversal Performance in Wireless Communications using Channel Measurements", publication details unknown.

(56) References Cited

OTHER PUBLICATIONS

Fink, M. and C. Prada, "Acoustic Time-Reversal Mirrors", Inverse Problems, vol. 17, pp. R1-R38, 2001.
Fink, M., "Time Reversal of Ultrasonic Fields-Part I: Basic Principals", IEEE Trans. Ultrasonics, Ferroelectrics and Freq. Contr., vol. 39, No. 5, pp. 555-566, Sep. 1992.
Fink, M., "Time-Reversal Mirrors", J. Phys. D: Appl. Phys., vol. 26, pp. 1333-1350, 1993.
Fink, M., "Time-Reversed Acoustics", Scientific American, pp. 91-97, Nov. 1999.
Fink, M., C. Prada, F. Wu, and D. Cassereau, "Self focusing in inhomogeneous media with time reversal acoustic mirrors," IEEE Ultrasonics Symposium, vol. 1, pp. 681-686, 1989.
Fontana, R.J., S.J. Gunderson, "Ultra-Wideband Precision Asset Location System", Proc. of the IEEE Conf. on UWB Sys. and Tech., pp. 147-150, 2002.
Guo, N., B.M. Sadler and R.C. Qiu, "Reduced-Complexity UWB Time-Reversal Techniques and Experimental Results", IEEE Trans. on Wireless Comm., vol. 6, No. 12, Dec. 2007.
Han, F. and K.J.R. Liu, "A multiuser TRDMA uplink system with 2D parallel interference cancellation," IEEE Transactions on Communications, vol. 62(3):1011-1022 (Mar. 2014).
Han, F. and K.J.R. Liu, "An Interference Cancellation Scheme for the Multiuser TRDMA Uplink System," Global Telecommunications Conference, pp. 3583-3588 (2013).
Han, F., "Energy Efficient Optimization in Green Wireless Networks", University of Maryland Ph. D. Dissertation, 2013.
Han, F., Y.H. Yang, B. Wang, Y. Wu, K.J.R. Liu, "Time-reversal division multiple access in multi-path channels," Global Telecommunications Conference, pp. 1-5 (Dec. 2011).
Han, F., Y.H. Yang, B. Wang, Y. Wu, K.J.R. Liu, "Time-reversal division multiple access over multi-path channels," IEEE Transactions on Communications, vol. 60(7):1953-1965 (Jul. 2012).
Han, Y., Chen, Y., and Liu, K.J.R, 'Time-Reversal with Limited Signature Precision: Tradeoff Between Complexity and Performance', Proc. IEEE Global Conference on Signal and Information Processing (GlobalSIP), Atlanta, Dec. 2014.
Henty, B.E. and D.D. Stancil, "Multipath-Enabled Super-Resolution for rf and Microwave Communication using Phase-Conjugate Arrays", Phys. Rev. Lett., vol. 93, 243904, Dec. 2004.
Jin, Y., Mourna, J., "Time-Reversal Detection Using Antenna Arrays", IEEE Trans. Signal Processing, vol. 57(4):1396-1414, Apr. 2009.
Jin, Yuanwei et al., "Adaptive time reversal beamfonning in dense multipath communication networks," 2008 42nd Asilomar Conference on Signals, Systems and Computers, pp. 2027-2031 (Oct. 2008).
Khalegi, A., G. El Zein and I. Navqi, "Demonstration of Time-Reversal in Indoor Ultra-Wideband Communication: Time Domain Measurement", IEEE Proc. of ISWCS, pp. 465-468, 2007.
Kuperman, W.A., W.S. Hodgkiss, H.C. Song, T. Akal, C. Ferla, D.R. Jackson, "Phase conjugation in the ocean: Experimental demonstration of an acoustic time-reversal mirror", J. Acoust. Soc. Am., vol. 103, No. 1, pp. 25-40, Jan. 1998.
Kyritsi, P. and G. Papanicolau, "One-bit Time Reversal for WLAN Applications", IEEE 16th Intern. Symp. on Personal, Indoor and Mobile Radio Comm., pp. 532-536, 2005.
Kyritsi, P. et al., "Time reversal and zero-forcing equalization for fixed wireless access channels," 39th Asilomar Conference on Signals, Systems and Computers, pp. 1297-1301 (2005).
Kyritsi, P. et al., "Time reversal techniques for wireless communications," IEEE Vehicular Technology Conference, vol. 1:47-51 (2004).
Lemoult, F., G. Lerosey, J. de Rosny, and M. Fink, "Manipulating Spatiotemporal Degrees of Freedom in Waves of Random Media", Phys. Rev. Lett., vol. 103, 173902, Oct. 2009.
Lemoult, F., G. Lerosey, J. de Rosny, and M. Fink, "Resonant Metalenses for Breaking the Diffraction Barrier", Phys. Rev. Lett., vol. 104, 203901, May 2010.

Lerosey, G., J. de Rosny, A. Tourin, A. Derode, G. Montaldo and M. Fink, "Time Reversal of Electromagnetic Waves and Telecommunication", Radio Science, vol. 40, RS6S12, 2005.
Lerosey, G., J. de Rosny, A. Tourin, A. Derode, G. Montaldo and M. Fink, "Time Reversal of Electromagnetic Waves", Phys. Rev. Lett., vol. 92, No. 19, 193904, May 2004.
Lerosey, G., J. de Rosny, A. Tourin, A. Derode, M. Fink, "Time Reversal of Wideband Microwaves", Appl. Phys. Lett, vol. 88, 154101, Apr. 2006.
Lerosey, G. J. de Rosny, A. Tourin, and M. Fink, "Focusing beyond the diffraction limit with far-field time reversal", Science, vol. 315, pp. 1120-1122, Feb. 2007.
Lienard, M. et al., "Focusing gain model of time-reversed signals in dense multipath channels," IEEE Antennas and Wireless Propagation Letters, vol. 11:1064-1067 ( 2012).
Ma, H., F. Han, and K.J.R. Liu, "Interference-Mitigating Broadband Secondary User Downlink System: A Time-Reversal Solution", Global Telecommunications Conference, pp. 884-889, (2013).
Montaldo, G., Lerosey, G., Derode, A., Tourin, A., de Rosny, J., Fink, M., "Telecommunication in a disordered environment with iterative time reversal", Waves Random Media, vol. 14:287-302, 2004.
Moura, J.M.F. and Y. Jin, "Detection by Time Reversal: Single Antenna", IEEE Trans. on Signal Process., vol. 55, No. 1, Jan. 2007.
Mourn., J.M.F. and Y. Jin, "Time Reversal Imaging by Adaptive Interference Canceling", IEEE Trans. on Signal Process., vol. 56, No. 1, Jan. 2008.
Naqvi, I.H., A. Khaleghi and G. El Zein, "Performance Enhancement of Multiuser Time Reversal UWB Communication System", Proc. of IEEE ISWCS, pp. 567-571, 2007.
Naqvi, I.H., G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, Iss. 5, pp. 643-650, 2010.
Naqvi, I.H., P. Besnier and G. El Zein, "Effects of Time Variant Channel on a Time Reversal UWB System", Global Telecommunications Conference, (2009).
Nguyen, H. T., "On the performance of one bit time reversal for multi-user wireless communications", IEEE Proc. of ISWCS, pp. 672-676, 2007.
Nguyen, H., F. Zheng, and T. Kaiser, "Antenna Selection for Time Reversal MIMO UWB Systems", IEEE Vehicle Technology Conference, pp. 1-5, 2009.
Nguyen, H., Z. Zhao, F. Zheng and T. Kaiser, "On the MSI Mitigation for MIMO UWB Time Reversal Systems", Proc. of IEEE International Conference on Ultra-Wideband, pp. 295-299, 2009.
Nguyen, H., Z. Zhao, F. Zheng, and T. Kaiser, "Preequalizer Design for Spatial Multiplexing SIMO-UWB TR Systems", IEEE Trans. on Vehicular Tech., vol. 59, No. 8, Oct. 2010.
Nguyen, H.T., "Partial one bit time reversal for UWB impulse radio multi-user communications", IEEE Proc. of ICCE, 2008.
Nguyen, H.T., Kovacs, I.Z., Eggers, P.C.F., "A time reversal transmission approach for multiuser UWB communications", IEEE Trans. Antennas and Propagation, vol. 54(11):3216-3224, Nov. 2006.
Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.
Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.
Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.
Parvulescu, A. and Clay, C. S., "Reproducibility of Signal Transmissions in the Ocean", The Radio and Electronic Engineer, pp. 223-228, Apr. 1965.
Phan-Huy, D. T., S.B. Halima, M. Helard, "Frequency Division Duplex Time Reversal", Global Telecommunications Conference, (2011).

(56) References Cited

OTHER PUBLICATIONS

Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.

Porcino, D., "Ultra-Wideband Radio Technology: Potential and Challenges Ahead", IEEE Communications Mag., pp. 66-74, Jul. 2003.

Prada, C., F. Wu, and M. Fink, "The iterative time reversal mirror: A solution to self-focusing in the pulse echo mode," J. Acoustic Society of America, vol. 90, pp. 1119-1129, 1991.

Price, R., "A Communication Technique for Multipath Channels", Proceeding of the IRE, pp. 555-570, 1958.

Qiu, R. C. et al., "Time reversal with miso for ultra-wideband communications: Experimental results," IEEE Antenna and Wireless Propagation Letters, vol. 5:269-273 (2006).

Rode, J. P., M.J. Hsu, D. Smith and A. Hussain, "Collaborative Beamfocusing Radio (COBRA)", Proc. of SPIE, vol. 8753, pp. 87530J-1-11, 2013.

Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.

Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.

Song, H. C., W.A. Kuperman, W. S. Hodgkiss, T. Akal, and C. Ferla, "Iterative time reversal on the ocean", J. Acoust. Soc. Am, vol. 105, No. 6, pp. 3176-3184, Jun. 1999.

Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.

Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).

Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.

Wang, B. et al., "Green wireless communications: A time-reversal paradigm," IEEE Journal of Selected Areas in Communications, vol. 29:1698-1710 (2011).

Wu, F., J.L. Thomas, and M. Fink, "Time Reversal of Ultrasonic Fields—Part II: Experimental Results", IEEE Trans. Ultrasonics, Ferroelectrics and Freq. Contr., vol. 39, No. 5, pp. 567-578, Sep. 1992.

Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.

Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.

Yang, Y. H., "Waveform Design and Network Selection in Wideband Small Cell Networks", University of Maryland Ph. D. Thesis, 2013.

Yang, Y. H., B. Wang and K.J.R. Liu, "Waveform Design for Sum Rate Optimization in Time-Reversal Multiuser Downlink Systems", Global Telecommunications Conference, (2011).

Yang, Y.-H., Wang, B., Lin, W.S., Liu, K.J.R., "Near-Optimal Waveform Design for Sum Rate Optimization in Time-Reversal Multiuser Downlink Systems", IEEE Trans Wireless Communications, vol. 12(1):346-357, Jan. 2013.

Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.

\* cited by examiner

| | OFDM | TRDMA |
|---|---|---|
| Tx | $\frac{N}{2N} \log_2 N$ complex multiplications<br>$\frac{N}{N} \log_2 N$ complex additions | $\frac{2M-1}{M} L - 1$ complex additions |
| Rx | $\frac{MN}{2N} \log_2 N$ complex multiplications<br>$\frac{MN}{N} \log_2 N$ complex additions | no additions or multiplications |

TIME-REVERSAL TECHNOLOGIES FOR HYBRID WIRELESS NETWORKS

CROSS-REFERENCE TO RELATED APPLICATION

This application claims priority to U.S. provisional application 62/106,395, filed on Jan. 22, 2015, which is herein incorporated by reference.

TECHNICAL FIELD

This disclosure generally relates to time-reversal technologies that can be used for communication, location determination, and gesture recognition systems. This disclosure will describe embodiments operating in the radio frequency range of the electromagnetic spectrum, but other operating frequencies are possible and should be considered within the scope of the invention.

BACKGROUND

Much of the early work on time reversal (TR) signaling used acoustic waves to probe and image targets through highly scattering (multi-path) media. Those early reports showed an interesting property of TR signaling which is that by properly forming a transmission signal and propagating it through a multi-path channel, some portion of the energy in the transmission signal can be focused in both space and time, at an intended location, such as that of a target. While initially utilized for imaging through highly scattering media, researchers also proposed utilizing the spatial and temporal focusing effects of TR signaling in wireless communication systems. As an example, imagine a first transceiver, A, that intends to communicate with a second transceiver, B. In a TR system, transceiver B may first send a delta-like (or other shape) probe pulse or series of pulses that propagate through a multi-path environment and arrive at transceiver A. Transceiver A may measure the arriving waveform, time-reverse (and phase conjugate) it, and transmit it back through the same multi-path channel to transceiver B. Based on channel reciprocity, the time-reversal signal sent by transceiver A may retrace its way back through the multi-path environment and arrive at transceiver B substantially reconstituted as a delta-like (or other shape) probe pulse or series of pulses. That is, the TR signaling treats the environment as a facilitating matched filter computing machine, and focuses at least a portion of the transmitted TR wave at the receiver in both the space and time domains.

SUMMARY

In wireless communications systems, the spatial and temporal focusing effects of time-reversal signaling can be utilized to achieve over an order of magnitude reduction in the amount of power needed for low bit error rate communications and may also substantially decrease inter-user and inter-symbol interference. A novel wireless communication protocol utilizing TR signaling, called time-reversal division multi-access (TRDMA) has been developed that shows improved performance under certain network operating conditions. Compared to traditional OFDMA protocols for example, under many operating conditions, TRDMA has been shown to support more users at higher achievable data rates with higher signal-to-noise ratios.

Transmitters and receivers for use in hybrid networks capable of supporting time-reversal division multi-access communication protocols are described.

In one aspect, a wireless access point includes a wireless receiver for receiving a wireless channel probe signal from a device and a wireless transmitter capable of supporting a time-reversal division multi-access (TRDMA) protocol and at least one other wireless communication protocol. A controller is used to control the operation of the wireless transmitter.

Implementations of the wireless access point may include one or more of the following features. An example of the at least one other wireless communication protocol that may be supported is OFDMA (orthogonal frequency division multi-access). Comparisons of network operations that highlight where different wireless communications protocols may achieve superior performance are provided. Network performance can be improved by using wireless access points that can switch between supporting one wireless communication protocol or another or supporting multiple wireless communication protocols simultaneously.

Different protocols may have advantages under different network operating scenarios and/or when supporting different classes of users. Since many wireless users are mobile users, the network operating scenarios may change as different users enter and leave a wireless network and as additional access points and other wireless components become part of a network's operating environment. The wireless access points can include at least one monitor that may monitor parameters such as bit error rate, QoS, SNR, the electromagnetic spectrum, and the like, to determine whether network performance can be improved by controlling the access point to support one or another or more wireless communications protocols.

In another aspect, a wireless terminal device includes a wireless transmitter for transmitting a wireless channel probe signal and a wireless receiver capable of supporting a time-reversal division multi-access (TRDMA) protocol and at least one other wireless communication protocol. A controller is used to control the operation of the wireless receiver.

Implementations of the wireless terminal device may include one or more of the following features. An example of the at least one other wireless communication protocol that may be supported is OFDMA. Comparisons of network operations that highlight where the different wireless communications protocols may achieve superior performance is provided. Network performance can be improved by using wireless terminal devices that switch between supporting one wireless communication protocol or another or supporting multiple wireless communication protocols simultaneously. Different protocols may have advantages under different network operating scenarios and/or when supporting different classes of users. Since many wireless users are mobile users, the network operating scenarios may change as different users enter and leave a wireless network and as additional access points and other wireless components become part of a network's operating environment. The wireless terminal devices can include at least one monitor that may monitor parameters such as bit error rate, QoS (quality of service), SNR (signal-to-noise ratio), the electromagnetic spectrum, and the like, to determine whether network performance can be improved by controlling the terminal device to support one or another or more wireless communications protocols.

Other aspects include other combinations of the features recited above and other features, expressed as methods, apparatus, systems, program products, and in other ways.

Unless otherwise defined, all technical and scientific terms used herein have the same meaning as commonly understood by one of ordinary skill in the art to which this invention belongs. In case of conflict with patent applications incorporated herein by reference, the present specification, including definitions, will control.

BRIEF DESCRIPTION OF THE DRAWINGS

FIG. 16 shows a table comparing the computational complexity of OFDMA and TRDMA systems. The derivation of these results can be found in "Time-Reversal Wideband Communications" by Y. Chen et al, in *IEEE Signal Processing Letters*, vol. 20, no. 12, December 2013.

Like reference symbols in the various drawings indicate like elements.

DETAILED DESCRIPTION

Overview

Figure 1:
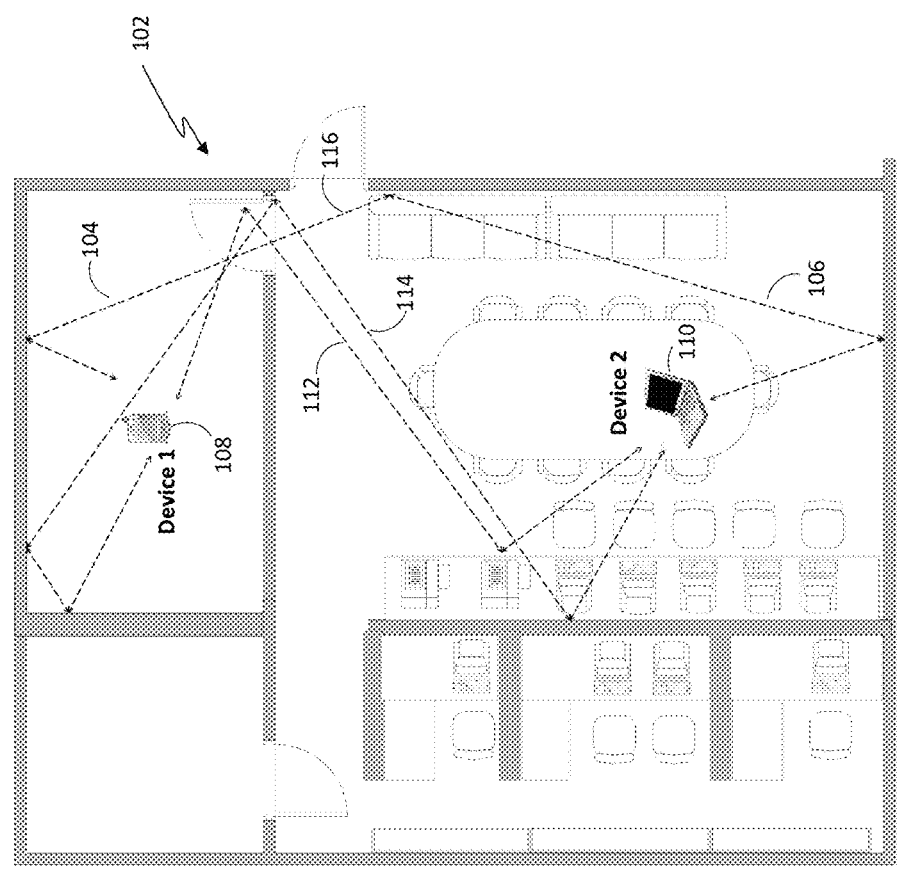
FIG. 1 is a diagram showing an exemplary environment for operating a time-reversal system.

The following provides an overview of a time-reversal multiuser downlink system. Referring to FIG. 1, a time-reversal system can be used in an environment having structures or objects that may cause one or more reflections of wireless signals. For example, an exemplary venue 102 may have a first room 104 and a second room 106. When a first device 108 in the first room 104 transmits a signal to a second device 110 in the second room 106, the signal can propagate in several directions and reach the second device 110 by traveling through several exemplary propagation paths, e.g., 112, 114, and 116. The signal traveling through multiple propagation paths is referred to as a multipath signal. As the signal travels through the propagation paths, the signal may become distorted and noise may be added. The multipath signal received by the second device 110 can be quite different from the signal transmitted by the first device 108.

Figure 2A:
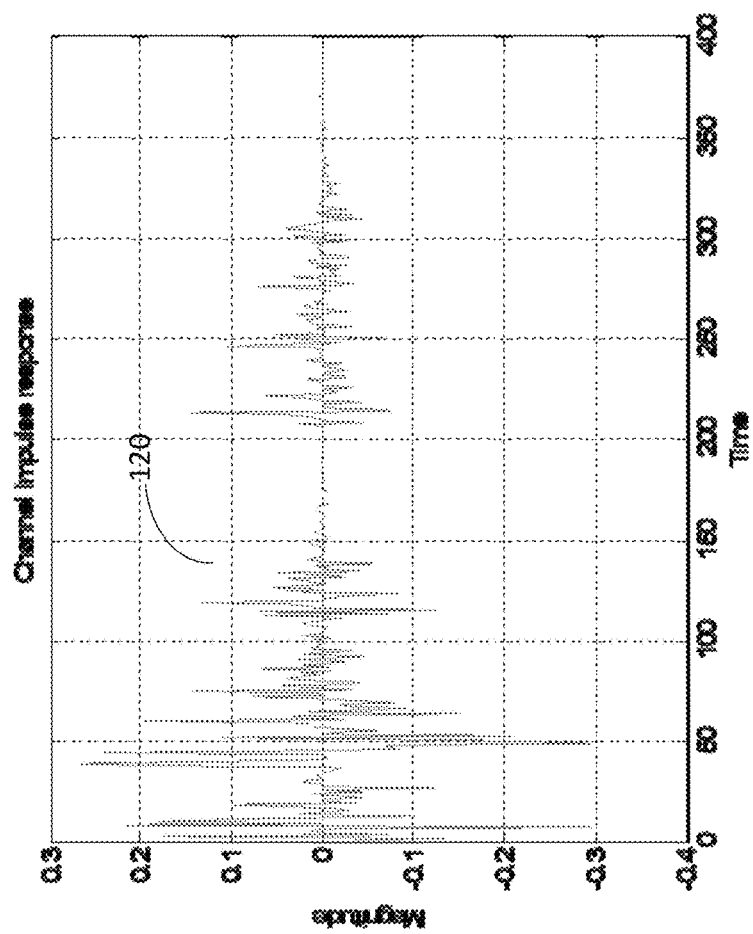
FIG. 2A is a graph of an exemplary channel impulse response waveform.

For example, referring to FIG. 2A, when the first device 108 sends a pulse signal, the signal received by the second device 110 may have an exemplary waveform 120. The waveform 120 may be referred to as the channel impulse response signal.

Figure 2B:
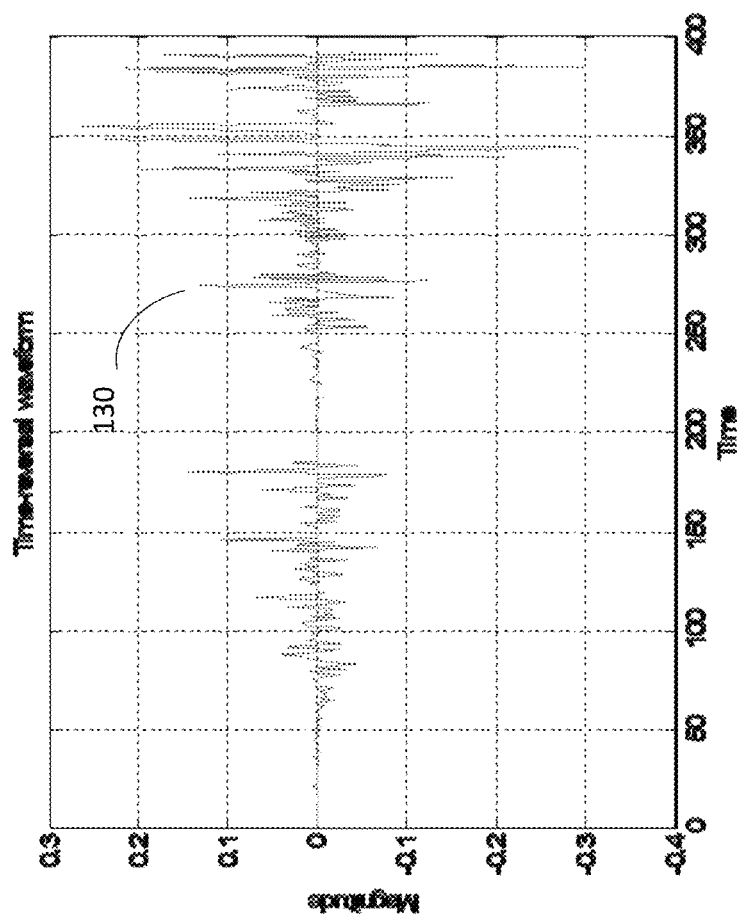
FIG. 2B is a graph of an exemplary time-reversed waveform generated by reversing the waveform of FIG. 2A with respect to time.

Referring to FIG. 2B, a time-reversed waveform 130 can be generated by detecting, digitizing and processing the received waveform where the processing includes reversing the waveform 120 with respect to time. If the second device 110 sends a signal having the time-reversed waveform 130 to the first device 108, the signal will propagate in various directions, including back through exemplary propagation paths 112, 114, and 116 (in reverse direction relative to the propagation direction of the impulse signal), and reach the first device 108. In an idealized situation, the multipath signal received at the first device 108 would form a pulse signal that is similar to the pulse signal previously sent from the first device 108 to the second device 110.

Real systems may differ from "idealized" systems in a number of ways. For example, in embodiments, the number of multi-path signals that can be captured at a first device 108 may be a subset of the total number of multi-paths generated by the environment. In embodiments, a first device may detect, digitize (or sample) and process a portion of a transmitted signal that travels directly along a line-of-sight between a first device and a second device. In embodiments, a first device may detect, digitize (or sample) and process one or more multi-path signals that arrive at the device within a certain time delay. Such a time delay may be referred to as a time delay window or a channel length. In embodiments, the time delay window may be variable and may be controlled by hardware and/or software in a device. In embodiments, a first device may detect, sample and process one or more multi-path signals with certain amplitudes. In embodiments, the certain amplitude may be an amplitude above a threshold amplitude and the threshold amplitude may be fixed or may be variable and may be controlled by hardware and/or software in a device. In exemplary TRDMA systems, different devices my collect different numbers of multipath signals and may have different settings for the time delay window or channel length, and/or amplitude threshold.

In embodiments, analog-to-digital converters (ADCs) and digital-to-analog converters (DACs) may be used in interfaces between analog and digital circuitry. In embodiments, the ADCs and/or DACs may utilize up to two (2) bits of resolution, up to four (4) bits of resolution, up to six (6) bits of resolution, up to eight (8) bits of resolution, up to ten (10) bits of resolution, up to twelve (12) bits of resolution or more bits of resolution. In embodiments, the ADCs and/or DACs may adaptively adjust the number of bits of resolution that are being used to digitize a signal. In exemplary embodiments, an ADC or DAC in a device may utilize 4 bits of resolution under normal operating conditions but may increase the number of bits of resolution to improve the temporal and/or spatial focusing effect of the TRDMA system. In other exemplary embodiments, an ADC or DAC in a device may utilize 8 bits of resolution under normal operating conditions but may decrease the number of bits of resolution to reduce the power utilization of the device. The number of bits of resolution of either or both of ADCs and DACs may be an adjustable parameter in a TRDMA transmitter and/or receiver. The number of bits of resolution of either or both of ADCs and DACs may be adjusted by a feedback loop and/or under software control. The number of bits of resolution may be a user settable parameter and may be accessed and set using a user interface and/or application running on a device of a TRDMA system.

In some embodiments, schemes referred to as continuous time binary variable or CTBV sampling, strobed sampling, swept threshold sampling, and the like, as described in Chapter 11 of "Ultrawideband Radar: Applications and Design", edited by J. D. Taylor, may be used to digitize and/or sample received waveforms. In exemplary embodiments, CTBV and similar techniques may reduce the power consumption and increase the speed of the digitization and/or sampling processes in the TRDMA hardware.

In embodiments, TRDMA systems may benefit from analog-to-digital converters (ADCs) and digital-to-analog converters (DACs) with relatively high sampling rates. For example, a TRDMA system with a 125 MHz receiver bandwidth might use ADCs and DACs with sampling rates higher than 250 MHz. In some examples, a TRDMA system can include ADCs and DACs with quoted sampling rates of 500 MHz. Broader band operation of TRDMA systems may require ADCs and DACs with GHz sampling rates and/or sampling techniques such as the CTBV, strobed sampling and swept threshold sampling techniques referred to previously.

In embodiments, processing a received channel probe signal may include amplifying or attenuating any portion of the received signal. In embodiments, a channel may be probed once or a channel may be probed more than once. In embodiments, multiple channel probe signal responses may be measured, processed, recorded, stored in a database, and the like. In embodiments, some channel probe signal responses may be averaged with others. In embodiments, some channel probe signal responses may be discarded or not recorded. In embodiments, some channel probe signal responses may be measured under different environmental conditions and stored. Such stored response signals may be used as reference signals to indicate the environmental conditions associated with the original measurements. In embodiments, a newly measured channel response signal may be compared to one or a number of previously stored channel response measurements to determine which previously stored channel response measurement most closely matches the newly measured channel response. Then, the environmental parameters of the most closely correlated previously stored channel response may be associated with the newly measured channel response. In exemplary embodiments, environmental conditions may include, but may not be limited to, temperature, location or placement of objects, location or placement of people, pose of objects, pose of people, location and/or pose of access points, terminal devices, position and/or pose of sensors, position and/or pose of signal reflectors, position and/or pose of signal scatterers, position and/or pose of signal attenuators, and the like.

Note that in exemplary embodiments, devices may have single input antennas or receivers and/or single output antennas or transmitters. In embodiments, devices may have multiple input antennas or receivers and/or multiple output antennas or transmitters. In this disclosure, it should be understood that first and second devices may include single or multiple input and/or output antennas and/or single or multiple receivers and/or transmitters. Different antennas, transmitters, and/or receivers may be designed to operate at similar carrier frequencies or in similar regions of the electromagnetic spectrum or they may be designed to operate at different carrier frequencies or in different regions of the electromagnetic spectrum. Antennas, transmitters and/or receivers may have different bandwidths and may comprise different hardware components, circuits, processors, software, firmware and the like.

In multiple antenna, transmitter and/or receiver embodiments, the multiple antennas, transmitters and/or receivers may operate completely independently of each other or they may operate in conjunction with each other. In embodiments, a subset of antennas, transmitters and/or receivers in a device may operate independently of others or in conjunction with others. In multiple antenna, transmitter and/or receiver embodiments, the multiple antennas, transmitters and/or receivers may share certain hardware components and software code. In multiple antenna, transmitter and/or receiver embodiments, the multiple antennas, transmitters and/or receivers may operate simultaneously, independently or in a synchronized manner. For example, some or all of the antennas, transmitter and/or receivers may utilize frequency hopping techniques and the frequency hopping may be coordinated amongst the various antennas, transmitters and or receivers.

In this disclosure, the use of the term device and/or terminal device may mean a device with single or multiple transmitters and/or with single or multiple receivers and/or with single or multiple antennas. The term receiver may mean a single receiver or multiple receivers and/or a single antenna or multiple antennas. The term transmitter may mean a single transmitter or multiple transmitters and/or a single antenna or multiple antennas. In some cases, a device may be any of a transmitter, a receiver and a transceiver (a combination of a transmitter and a receiver).

Figure 2C:
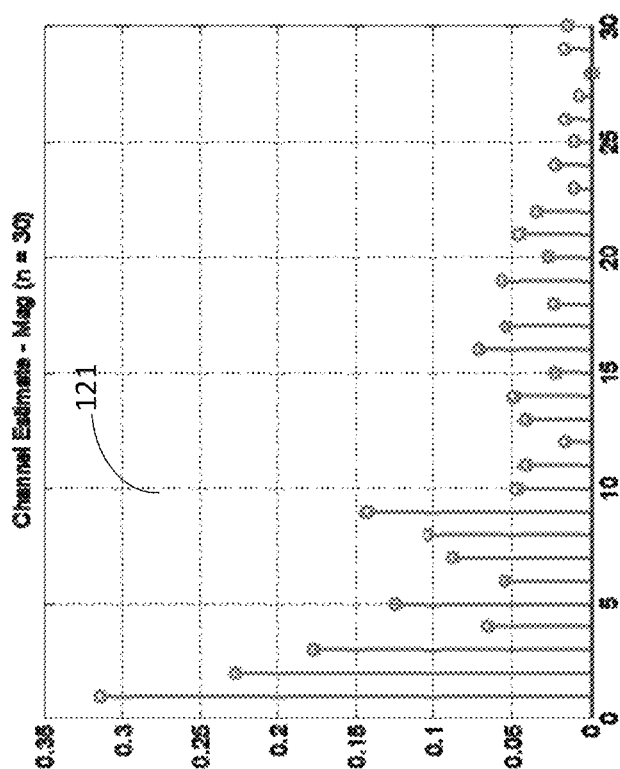
FIG. 2C is a graph of a sampled (or digitized) exemplary channel impulse response waveform between an access point and a terminal device.
Figure 2D:
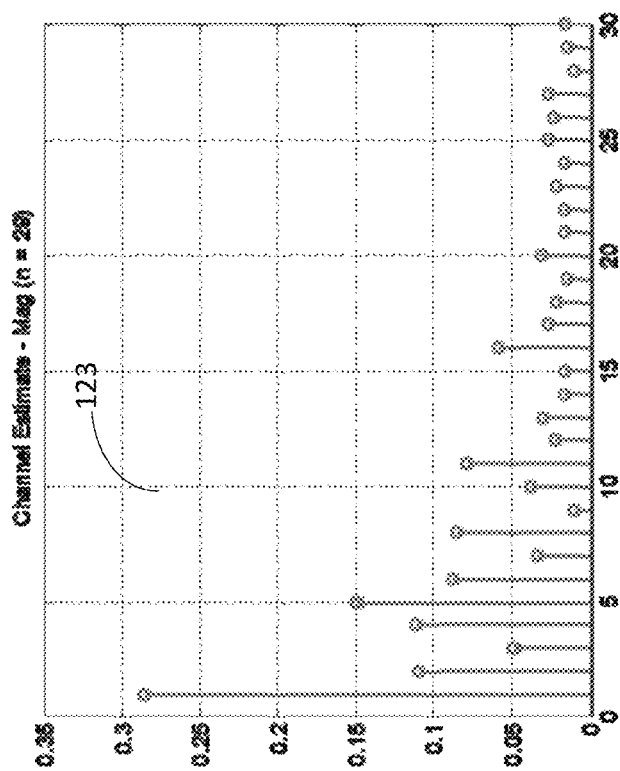
FIG. 2D is a graph of a sampled (or digitized) exemplary channel impulse response waveform between the same terminal device of FIG. 2C and a different access point.

The waveforms 120 and 130 shown in FIGS. 2A and 2B are merely examples. The waveforms in time-reversal systems can vary depending on, e.g., the probe signal, the environment, including the electronic transmitters and receivers, and the information or data being transmitted. The waveforms 121 and 123 shown in FIGS. 2C and 2D are examples of sampled channel probe signal responses measured at two different access points in which the samples were derived from the same probe signal sent from the same terminal device. These two plots show exemplary differences in channel probe signal responses. In addition, the use of a pulse signal as the channel probing signal is merely an example. The channel probe signals in time-reversal systems can vary depending on, e.g., the environment, including the electronic transmitters and receivers, and the information or data being transmitted. While pulse or impulse signals have been used in the prior art, different probe signals, waveforms, signatures and the like are all envisioned in this disclosure.

For example, the channel probe signal may be a single pulse or a series of pulses with a regular, arbitrary or non-regular pattern. The probe signal may be a waveform, including a pulse waveform. Waveforms may be substantially square waveforms, raised cosine waveforms, Gaussian waveforms, Lorentzian waveforms, or waveforms with shapes that have been designed to probe the channel in some optimal or desired way. For example, probe waveforms may be frequency chirped or may have a frequency spectrum that is tailored to probe the channel in some optimal or desired way. Probe waveforms may be amplitude modulated, phase modulated, frequency modulated, pulse position modulated, polarization modulated, or modulated in any combination of amplitude, phase, frequency, polarization, and pulse position. The waveform may have a temporal width that is substantially equal to the bit duration of the data stream intended to be exchanged over the associated communication channel. The waveform may have a temporal width that is substantially half, substantially one quarter, substantially one tenth, substantially one hundredth, or less than the bit duration of the data stream intended to be exchanged over the associated communication channel. The probe signal/waveform may be a data pattern and may be a repeating data pattern. The probe signal may include packet and/or framing information, synchronization and/or clock recovery information, stream capture information, device ID and network and link layer operation information. The probe signal may have a frequency spectrum that has been tailored for the operating environment and/or the electronic components in the transmitters and/or receivers of the systems. The probe signal may be an estimate of the channel impulse response or may be an altered version of the estimate of the channel impulse response. The probe signal may be designed to compensate for or to accentuate signal distortions imposed by certain electronic components in the transmitters and/or receivers and/or imposed by certain environmental factors.

When the second device 110 intends to transmit a data stream to the first device 108, the second device 110 may use a normalized time-reversed conjugate version of the received probe signal as a basic waveform. The second device 110 may encode the basic waveform with the data signal and transmit the encoded signal through the wireless channel. The baud rate may be lower than the sampling rate. As long as the channel has not changed significantly between the receiving of the probe signal and the sending of the data signal, the signal received at the receiver, in this case device 108, will be approximately the convolution of the transmitted signal and the channel probe signal response, plus noise. The first device 108 may perform a one-tap gain adjustment to the received signal and may down-sample it to recover the data stream transmitted by the second device 110.

In some embodiments, the basic waveform may be altered to improve or change system operation. In embodiments, the basic waveform may be altered by altering the time delay window or channel length of the measured channel probe signal response. In embodiments, the basic waveform may be altered by altering the sampling (or digitization) rate of the measured channel probe signal response. In embodiments, the basic waveform may be altered by altering the resolution of the sampling/digitization of the measured channel probe signal response. In embodiments, any combination of alterations may be used to alter the basic waveform.

In some examples a transmitter may send signals to two or more receivers at the same time. The transmitted signal may travel through multiple exemplary propagation paths to each receiver. Because the receivers are positioned at different locations, the transmitted signals travel through at least some different propagation paths to reach the receivers. Therefore, different multipath signals may be associated with different receivers. By carefully constructing the waveform of the signal sent from the transmitter, it is possible to allow each receiver to preferentially receive data intended for that receiver with sufficiently high quality. That is, the intended data signals may be at least partially focused in time and space at each of the receivers. In this way, TRDMA may be used to achieve at least some level of spatial multiplexing.

Note that the first device 108 in FIG. 1 may also be referred to as a terminal device (TD). Note too that the second device 110 in FIG. 1 may be referred to as an access point (AP). In all of the disclosed embodiments, it is envisioned that wireless networks using the disclosed technology may comprise at least two devices and such networks may comprise three or more devices. For the sake of explanation and in certain embodiments, devices may be identified as transmitters or receivers, but it should be understood that the devices could also be transceivers, radios, software radios, handsets, mobile devices, computers, routers, modems, tags, circuit boards, semiconductor chips, and the like. Devices may be fully bi-directional or they may be configured to have more functionality as transmitters or as receivers or to support different data rates, protocols, power levels and the like in the transmit and receive modes. Multiple access points may communicate back and forth with each other and multiple terminal devices may communicate back and forth with each other. In some embodiments, an access point may be a fixed module that allows wireless devices to be connected to a wired or another wireless network. Access points may support a wide variety of networking protocols and/or transmission protocols and may include or may be connected to additional computing engines and/or devices to achieve enhanced performance. Access points may be routers, modems, servers, switches, terminals, transmitters, repeaters, and the like and may be the signal source to support hot spots, local area networks, cells, microcells, nanocells, picocells, femtocells, and the like. Access points may support multiple wireless transmission standards, formats and protocols including, but not limited to WiFi, 802.11xx, Bluetooth, Bluetooth LE, Zigbee, Near Field Communications (NFC), infrared communications, OFDMA, code division multiple access (CDMA), LTE, 3G, 4G, 5G, and the like.

Figure 3:
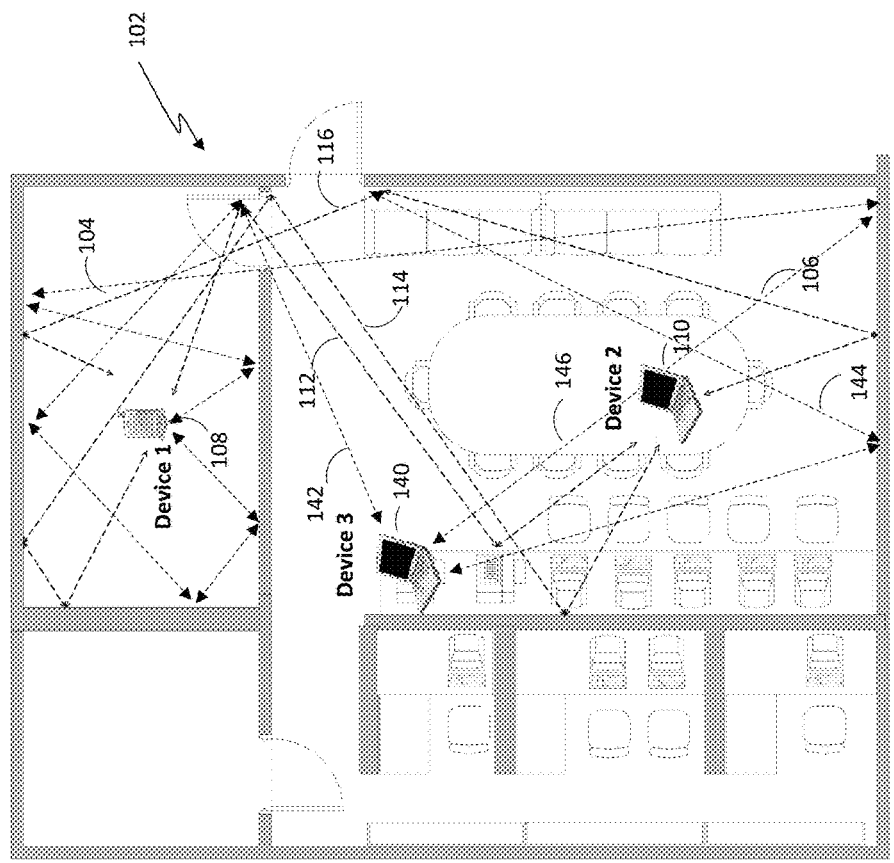
FIG. 3 is a diagram showing an exemplary environment for operating a time-reversal system having multiple receivers.

Referring to FIG. 3, the first device 108 may communicate with a second device 110 and a third device 140. The second device 110 may send a probe signal that travels through exemplary propagation paths 112, 114, and 116 to the first device 108. The first device 108 may detect, digitize (or sample), process, record, and the like, the received waveform representing the channel probe signal response for the first multipath channel. The third device 140 may send a probe signal that travels through exemplary propagation paths 142, 144, and 146 to the first device 108. The first device 108 may detect, digitize, process, record, and the like, the received waveform representing the channel probe signal response for the second multipath channel. In some embodiments, the probe signal used for the first multipath channel may be substantially the same as the probe signal used for the second multipath channel. In some embodiments, the probe signal used for the first multipath channel may be different than the probe signal used for the second multipath channel.

Note that throughout this disclosure we may use the terms "channel impulse response" and "channel probe response" and "channel probe signal response" interchangeably. These responses may refer to a conventional channel impulse response such as determined by a delta-like pulse probing a channel. These responses may also refer to the conventional channel impulse response as determined by a pulse of some finite duration and may also refer to the waveform that results from probing the channel with any of the channel probing signals described above.

The first device 108 may construct a downlink signal based on a first time-reversed multipath channel probe signal response, a second time-reversed multipath channel probe signal response, a first data stream intended for the second device 110, and a second data stream intended for the third device 140. The first device 108 may transmit the downlink signal so that a first portion of the downlink signal travels through exemplary propagation paths 112, 114, and 116 to reach the second device 110. A second portion of the downlink signal may travel through exemplary propagation paths 142, 144, and 146 to reach the third device 140. The first signal portion received at the second device 110 may correspond to the first data stream. The second signal portion received at the third device 140 may correspond to the second data stream.

In the example of FIG. 3, the first device 108 transmits two data streams simultaneously to the second device 110 and the third device 140. Using the same principle, the second device 110 can receive channel probe signal response signals from the first device 108 and the third device 140, and then transmit two data streams simultaneously to the first device 108 and the third device 140 using waveforms that are determined according to time-reversed channel probe signal response signals. The third device 140 can also receive channel probe signal response signals from the first device 108 and the second device 110, and then transmit two data streams simultaneously to the first device 108 and the second device 110 using waveforms that are determined according to time-reversed channel probe signal response signals. In general, when there are three or more devices, each device can transmit two or more data streams simultaneously to two or more other devices.

In the example of FIG. 3, the device operating as a transmitter may use either an omnidirectional antenna or a directional antenna for broadcasting the downlink signal, as long as the downlink signal reaches each of the receivers through multiple propagation paths.

Transmission Waveform Design

U.S. patent application Ser. No. 13/706,342, incorporated herein in its entirety by reference describes near-optimal waveform design for sum rate optimization in time-reversal multiuser downlink systems. In some examples, a traditional time-reversal (TR) waveform is able to boost the signal-to-noise ratio at the receiver in a multipath channel. Such a waveform is generated based on the time-reverse (and phase conjugate) of the channel impulse response or the channel probe signal response. When that signal is transmitted back through each multipath with channel reciprocity, at least some portion of the signal energy is focused in time and space at the position of the receiver. The environment is used to perform deconvolution for the system.

In broadband communication systems, the traditional time-reversal technique can be viewed as a simple matched-filter of the multipath channel that increases the signal-to-noise ratio (SNR) at the receiver when using single-tap detection. Such a waveform can be optimal when one symbol is transmitted or at very low data rates and with very few users of the system. When the symbol rate is high, large delay spreads of the traditional time-reversal waveform may result in severe inter-symbol interference (ISI). In multiuser downlink communications, one transmitter can broadcast different data streams to many receivers at the same time. Since each receiver may be only interested in its own data stream, the unintended data streams may introduce inter-user interference (IUI) to each receiver.

This document describes a new system with single-tap detection that performs well in the presence of both inter-symbol interference and inter-user interference. A near-optimal waveform design to maximize the weighted sum rate by simultaneously suppressing the inter-symbol interference and inter-user interference is described. An efficient solution to the weighted sum rate maximization problem for multiple data streams is described. For a single data stream, the novel system described herein performs better than some traditional methods when there is high interference.

The novel systems described herein are implemented based on the uplink-downlink duality, i.e., the waveform design for the downlink can be obtained using a virtual uplink, given any power allocation. However, the power allocation problem for sum rate optimization is non-convex for either uplink or downlink. By exploiting the relation between the allocated power and the SINR (signal to interference and noise) targets, a system using a power allocation algorithm called "Iterative SINR Waterfilling" can achieve comparable performance to the globally-optimal power allocation.

In some implementations, the SINRs are allocated to the users to maximize the weighted sum rate, and with the allocated target SINRs, the corresponding power allocation can be determined. For multiple data streams, a system can be implemented using an iterative power allocation algorithm called "Iterative Power Waterfilling," which is the multiple-data-stream extension of a modified iterative waterfilling algorithm. Simulation results showed that both of the approaches significantly outperform traditional waveform designs such as zero-forcing and basic time-reversal waveforms.

In the following description, we summarize some exemplary near-optimum waveform design techniques for time-reversal communication systems.

In an exemplary time-reversal system, a receiver may first send a probe signal (e.g., an impulse signal or a series of pulses or waveforms with a regular, arbitrary or non-regular pattern), which is then received by the transmitter as a channel probe signal response. Using the channel probe signal response, the transmitter may form the time-reversed waveform and send data symbols using the time-reversed waveform.

Figure 4:
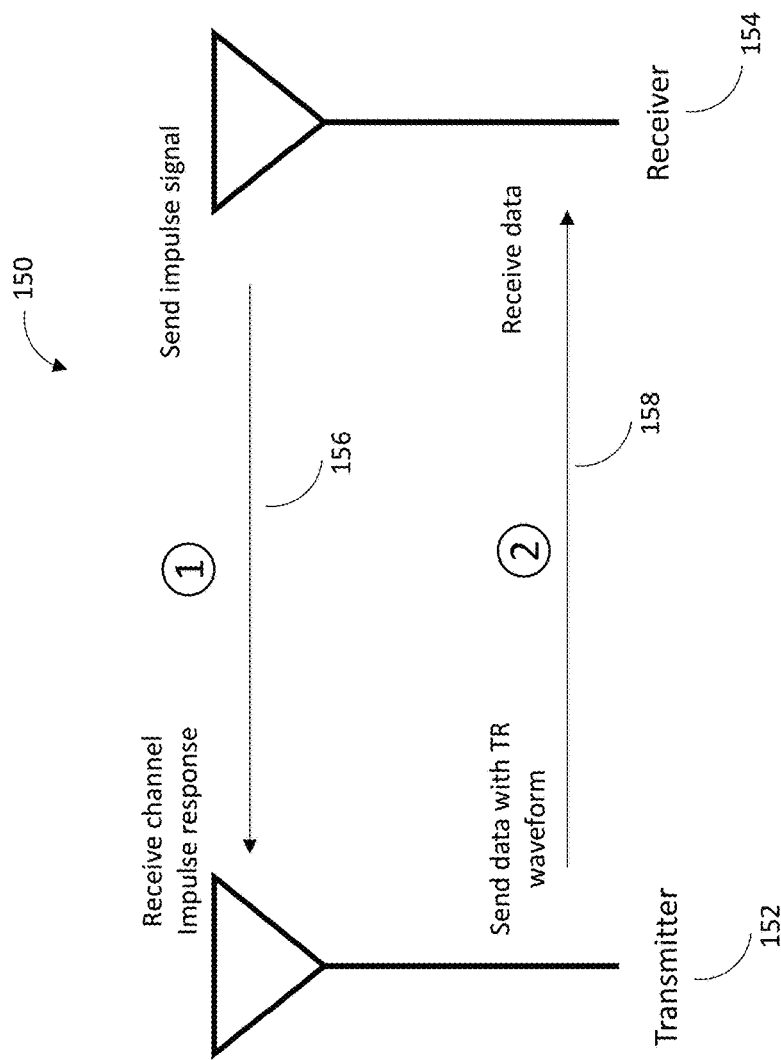
FIG. 4 is a schematic diagram of an exemplary time-reversal system using an impulse signal as the probe signal.

FIG. 4 shows a schematic diagram of an exemplary time-reversal system 150 in which the probe signal is an impulse signal. In this example, the system 150 uses multiuser downlink multipath channels with one transmitter 152 and K users each having a receiver 154 (only one receiver is shown in the figure). The receiver 154 may first send (156) an impulse signal to the transmitter 152, which receives the channel impulse response signal. The transmitter 152 may then send (158) data encoded onto the time-reversal waveforms.

The receive signal of the k th user at time m, $y_k[m]$, can be written as $$y_k[m] = \sum_l h_k[m-l]s[l] + n_k[m], \quad \text{(Equ. 1)}$$

where $s[m]$ is the transmit signal and $k[m]$ denotes the channel impulse response of user k. The channel length of $h_k[m]$ is denoted by $L_k$, i.e., $h_k[m]=0$ for $m<0$ and $m \geq L_k$. Writing Equation 1 in a matrix form, we have the receive signal vector of the k th user as $$y_k = H_k s + n_k = H_k \left( \sum_{j=1}^{K} u_j \sqrt{p_j} x_j \right) + n_k, \quad \text{(Equ. 2)}$$

where $y_k$ is a $(2L-1) \times 1$ vector with $L = \max_k L_k$, $u_j$ is the transmit waveform, $p_j$ is the transmit power allocated to user j, $x_j$ is the intended signal for user j, and $n_k$ is the additive white Gaussian noise (AWGN) with mean zero and variance $\sigma^2$. In Equation 2, $H_k$ is a $(2L-1) \times L$ Toeplitz matrix with each column vector being the shifted version of $\{h_k[m]\}_{m=1}^{L}$.

In an exemplary time-reversal communication system, user k may estimate the received signal using $y_k[L]$. Let $H_k^{(l)}$ denote the l th row of $H_k$, the symbol at time slot l for user k as $x_k(l)$, and $[n_k]_L$ as the L th element of $n_k$. Then, the characterization of the signal with inter-symbol interference and inter-user interference can be given by $$y_k[L] = H_k^{(L)} u_k \sqrt{p_k} x_k(L) + H_k^{(L)} \left( \sum_{j=1, j \neq k}^{K} u_j \sqrt{p_j} x_j(L) \right) + \sum_{l=1, l \neq L}^{2L-1} H_k^{(l)} \left( \sum_{j=1}^{K} u_j \sqrt{p_j} x_j(l) \right) + [n_k]_L. \quad \text{(Equ. 3)}$$

Assume that user k only decodes its own current symbol $x_k(L)$ and considers the interferences (inter-user interference and inter-symbol interference) as noise. Then the SINR of user k is given as $$SINR_k^{DL} = \frac{u_k^H R_k^{(1)} u_k p_k}{u_k^H R_k^{(0)} u_k p_k + \sum_{j=1, j \neq k}^{K} u_k^H R_k u_j p_j + \sigma^2}, \quad \text{(Equ. 4)}$$

where $R_k^{(1)} = H_k^{(L)H} H_k^{(L)}$, $R_j = H_j^H H_j$, and $R_k^{(0)} = R_k - R_k^{(1)}$. The superscript DL denotes the downlink. The first term and the second term in the denominator denote inter-symbol interference and inter-user interference, respectively.

It is possible to jointly design the waveform $U = [u_1, \ldots, u_K]$ and power allocation vector $p = [p_1, \ldots, p_K]^T$ to maximize the weighted sum rate subject to a total power constraint $P_{max}$, i.e., $$P_{Rate}^{DL}: \max_{p,U} \sum_{k=1}^{K} \alpha_k \log(1 + SINR_k^{DL}) \quad \text{(Equ. 5)}$$

$$s.t. \ 1i^T p \leq P_{max}, u_i^H u_i = 1, p_i \geq 0, \forall i, \quad \text{(Equ. 6)}$$

where $\alpha_k$ denotes the rate weighting coefficient for user k, and 1 is an all-one vector with K elements.

As shown in Equation 4, the SINR of every user depends on the waveforms of all users, so all users' waveforms may be jointly designed at the same time. In some systems, near-optimal waveforms may be designed for only some of the users. In other systems, different waveform design methodologies may be followed for certain users or subsets of users of the time-reversal systems. For example, in a time-reversal system, some users' waveforms may be designed using the method and apparatus described herein and in the references incorporated herein. In other systems, some users or a subset of users may use basic and/or traditional time reversal waveforms. Thus, systems that utilize different types of waveforms for different users are contemplated in this disclosure.

Figure 5:
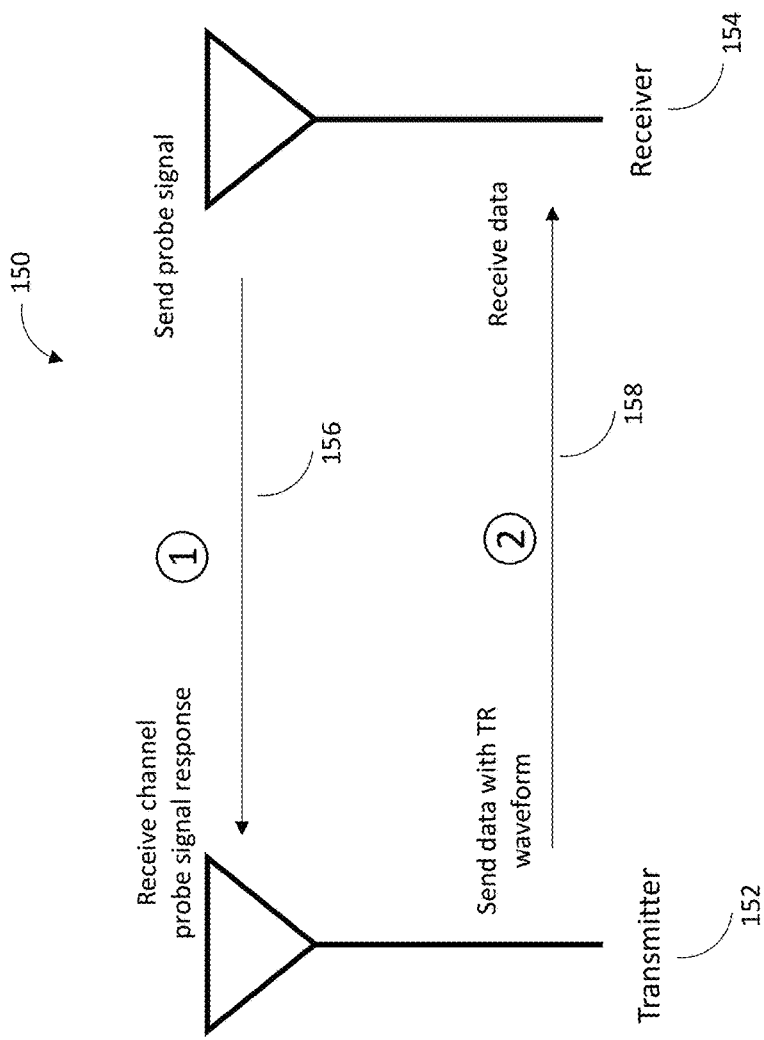
FIG. 5 is a schematic diagram of an exemplary time-reversal system using any type of signal as the probe signal.

In other exemplary systems, time-reversal signaling may be used by some users of a network while other users of the network use conventional signaling schemes such as those based on OFDM and CDMA, as non-limiting examples. Note too that in exemplary TRDMA systems, the probe signal does not have to be an impulse signal. As described above, and as represented in FIG. 5, the channel probe signal may be a single pulse or a series of pulses with a regular, arbitrary or non-regular pattern, including a pseudo-Noise (PN) signal. The probe signal may be a waveform, including a pulse waveform.

Time-Reversal Systems

Figure 6:
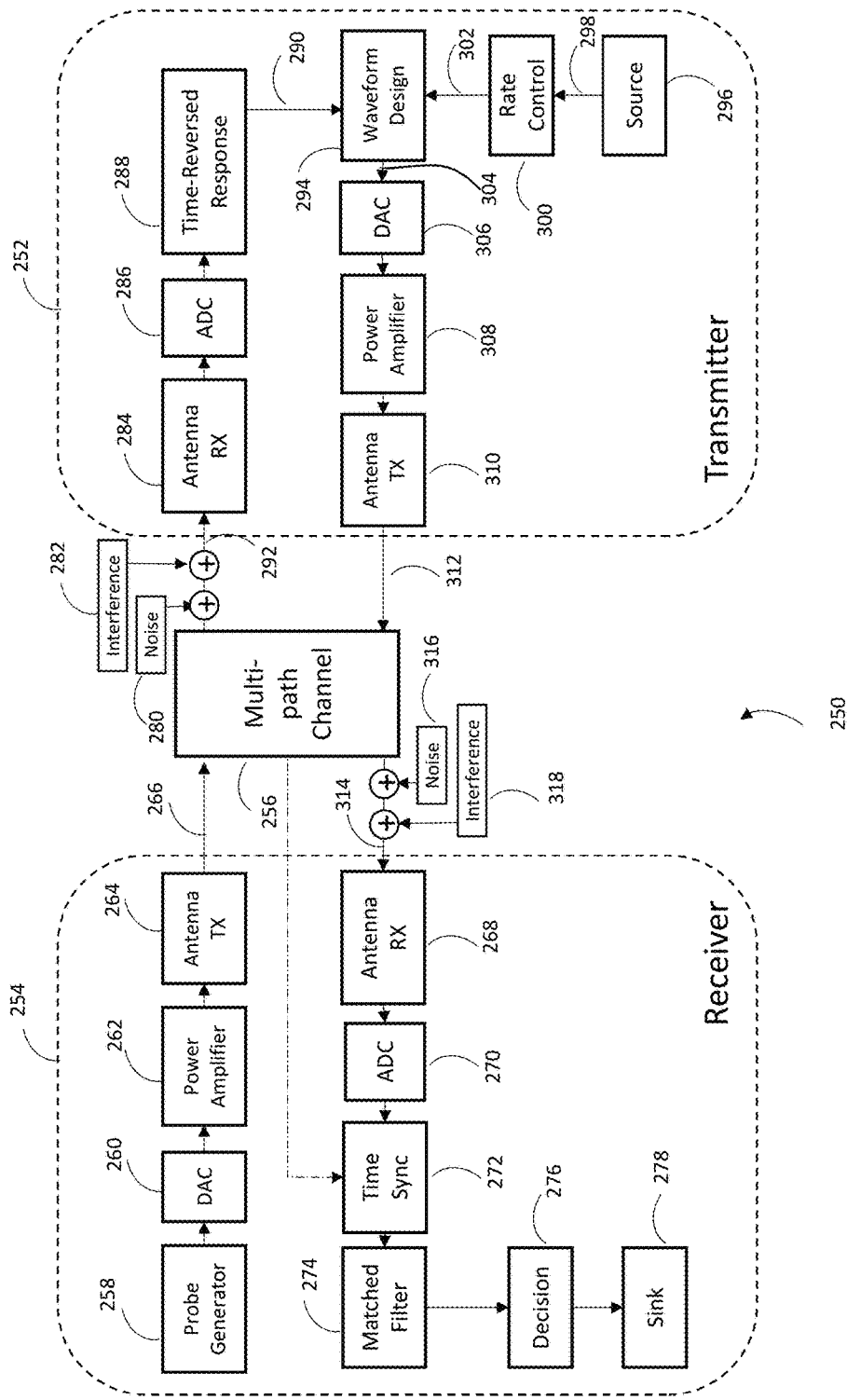
FIG. 6 is a block diagram of an exemplary time-reversal communication system.

Referring to FIG. 6, in some exemplary embodiments, a time-reversal communication system 250 may include a transmitter 252 that communicates with receivers 254 through a multi-path channel 256. In this figure, only one receiver is shown. There can be two or more receivers. The receiver 254 may include a probe signal generator 258 to generate a probe signal, a digital-to-analog converter (DAC) 260 to convert a digital signal to an analog signal, a power amplifier 262 to amplify the analog pulse signal, and a transmit antenna 264 to transmit an analog probe signal 266. In some embodiments, the probe signal generator 258 may generate a pulse signals, customized signal streams and/or probe waveforms for probing the wireless channel.

The receiver 254 may include any and/or all of the following components: a receive antenna 268 to receive incoming signals, an analog-to-digital converter (ADC) 270 to convert an analog signal to a digital signal, a time synchronization unit 272 to facilitate synchronization of signals, a match filter 274 to filter the incoming signals, a decision unit 276 to make decisions on the incoming data (e.g., determining whether an incoming data is a '0' bit or a '1' bit), and a sink unit 278 representing a unit that receives the incoming data.

When the probe signal 266 is transmitted through the multi-path channel 256, the probe signal 266 is affected by the channel and becomes the channel probe signal response signal 292. The channel probe signal response signal 292 may include added noise 280 and may include interference 282 depending on the details of the probe signal and the number and location of other users and/or transmitters in the system.

The transmitter 252 may include any and/or all of the following components: a receive antenna 284 that may receive the channel probe response signal 292, and an analog-to-digital converter (ADC) 286 to convert an analog signal to a digital signal. A time-reversed response unit 288 may generate a time-reversed waveform 290 by reversing the probe response signal 292 with respect to time. For example, the time-reversed response unit 288 may generate the time-reversed waveform 130 of FIG. 2B if the probe signal is a pulse or an impulse and given the channel impulse response waveform 120 of FIG. 2A. The time-reversed waveform 290 may be provided to a waveform design unit 294. A source unit 296 may be a unit that generates data 298 to be transmitted to the sink unit 278. The data 298 may be provided to a rate control unit 300 that controls the data rate to be transmitted. The rate control unit 300 may provide a data signal 302 (whose data rate may have been adjusted by the rate control unit 300) to the waveform design unit 294. The waveform design unit 294 may generate a downlink transmit waveform $U=[u_1, \ldots, u_K]$ in which power is allocated to the waveforms $u_k$ according to the downlink power allocation coefficients $p=[p_1, \ldots, p_K]^T$ as described above and in the incorporated references describing near-optimum waveform designs for time-reversal systems. In some exemplary systems, the data signals may include basic and/or traditional time-reversal waveforms and may bypass the waveform design unit 294, or pass-through the waveform design unit 294 with minor alterations or unaltered. The waveforms $u_k$ may be combined into a downlink signal 304 that may be provided to a digital-to-analog converter (DAC) 306 that converts the downlink signal to an analog signal. A power amplifier 308 may amplify the analog downlink signal, and the amplified downlink signal may be transmitted by a transmit antenna 310. The transmit antenna 310 may send a transmit signal 312 through the multi-path channel 256, resulting in a signal 314 that is received by the receive antenna 268 of the receiver 254. The signal 314 may include noise 316 and interference 318, which may include inter-symbol interference and inter-user interference.

The waveform design unit 294 may determine the waveform $U=[u_1, \ldots, u_K]$ and the downlink power allocation coefficients $p=[p_1, \ldots, p_K]^T$ according to the processes as described above and in the incorporated references describing near-optimum waveform designs for time-reversal systems.

Figure 7:
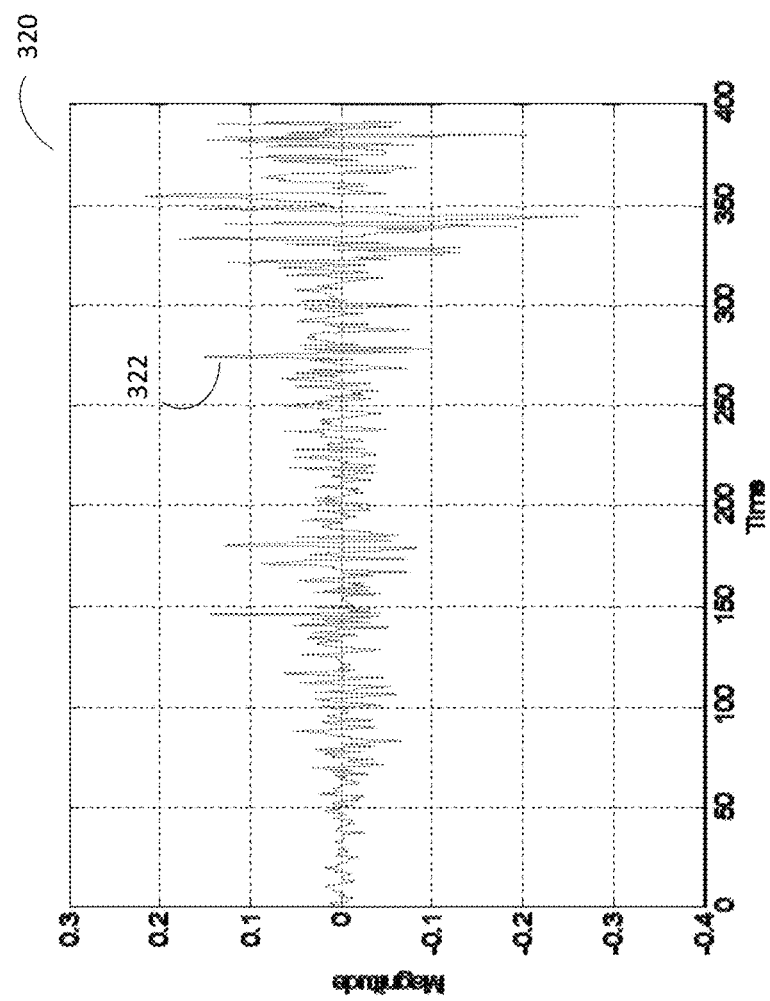
FIG. 7 is a graph showing an exemplary near-optimal waveform used in a time-reversal communication system.

FIG. 7 is a graph 320 showing an exemplary simulated near-optimal waveform 322 that was determined using the processes described above and in the incorporated references describing near-optimum waveform designs for time-reversal systems. In this example, the simulation parameters are the same as those used for FIGS. 2A and 2B. In the example of FIG. 2B, when the transmitter sends a downlink signal having the waveform 130, the signal received by the receiver is a pulse signal. Similarly, in the example of FIG. 7, when the transmitter sends a downlink signal having the waveform 322, the signal received by the receiver is also a pulse signal. An exemplary advantage of using the waveform 322 is that inter-symbol interference and inter-user interference are suppressed.

The waveform 322 shown in FIG. 7 is merely an example. The waveforms generated by the waveform design unit 294 can vary depending on, for example but not limited to, the environment, the transmitter and receiver hardware components, and the data being transmitted.

Figure 8:
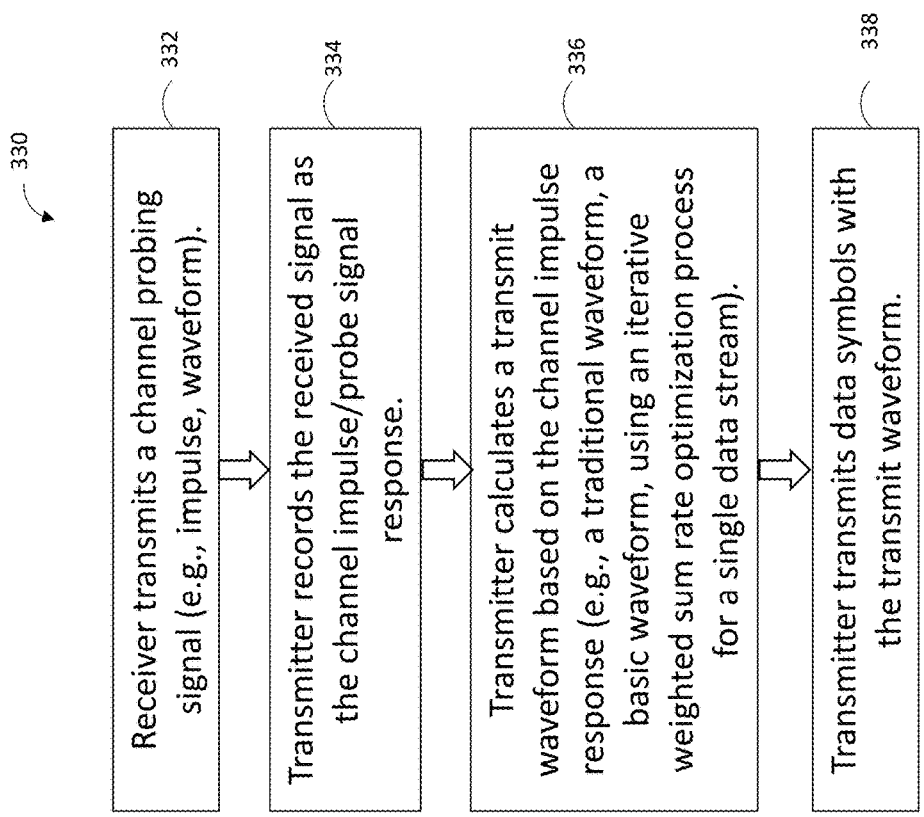
FIG. 8 is a flowchart of an exemplary procedure for operating a time-reversal communication system.

FIG. 8 is a flowchart of an exemplary procedure 330 for operating a time-reversal communication system. The procedure 330 may be performed by the exemplary time-reversal communication system 250 of FIG. 6.

In the procedure 330, a receiver transmits (332) a probing signal. The receiver can be, e.g., the receiver 254 of FIG. 6.

A transmitter records (334) the received signal as the channel impulse/probe signal response. The transmitter can be, e.g., the transmitter 252 of FIG. 6.

The transmitter calculates (336) the transmit waveform which may be a traditional time-reversal waveform, a basic time-reversal waveform or may be generated using the iterative weighted sum rate optimization process for a single data stream.

The transmitter transmits (338) data symbols with the transmit waveform.

Figure 9:
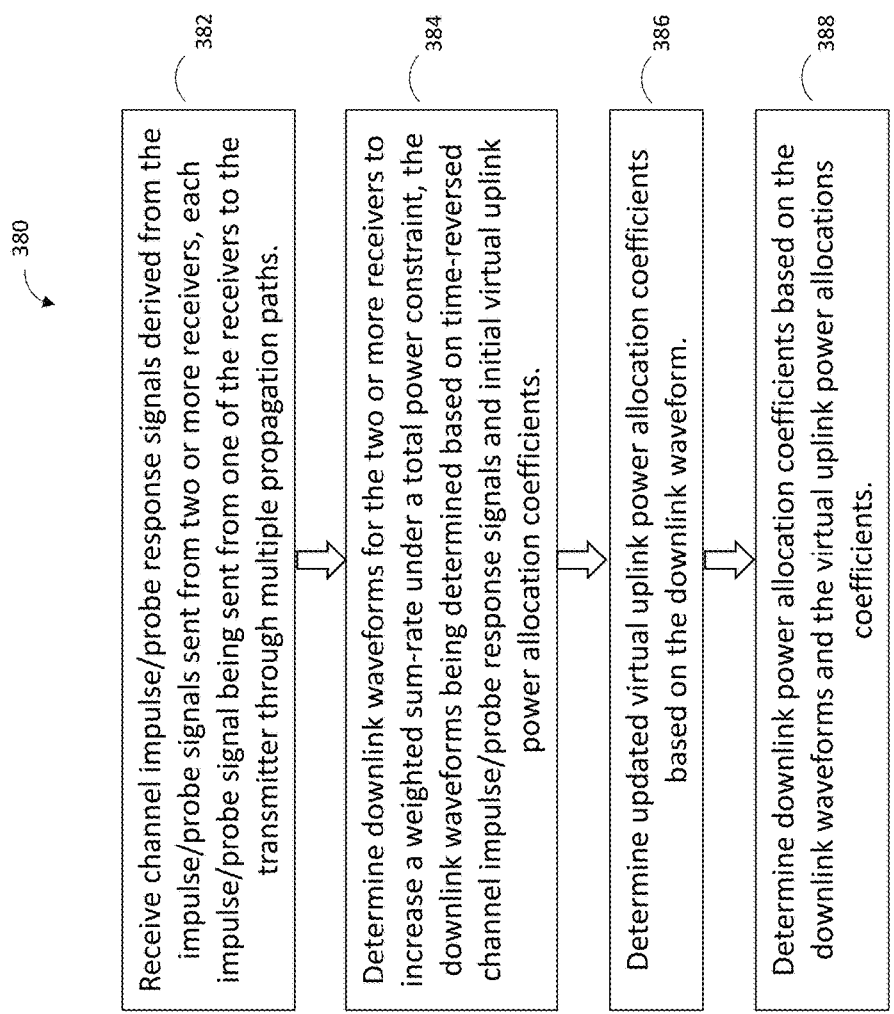
FIG. 9 is a flowchart of an exemplary procedure for implementing iterative weighted sum rate optimization.

FIG. 9 is a flowchart of an exemplary procedure 380 for implementing iterative weighted sum rate optimization. The procedure 380 may be performed by, e.g., the exemplary transmitter 252 of FIG. 6. In this example, the probe signal is an impulse signal, but other probe signal waveforms can also be used.

In procedure 380, a transmitter receives (382) channel impulse response signals derived from impulse signals sent from two or more receivers, each impulse signal being sent from one of the receivers to the transmitter through multiple propagation paths.

Downlink waveforms for the two or more receivers are determined (384) so as to increase a weighted sum-rate, defined in (Equ. 5), under a total power constraint, the downlink waveforms being determined based on time-reversed channel impulse response signals and initial virtual uplink power allocation coefficients.

Updated virtual uplink power allocation coefficients are determined (386) based on the downlink waveforms.

Downlink power allocation coefficients are determined (388) based on the downlink waveforms and the virtual uplink power allocation coefficients.

Figure 10:
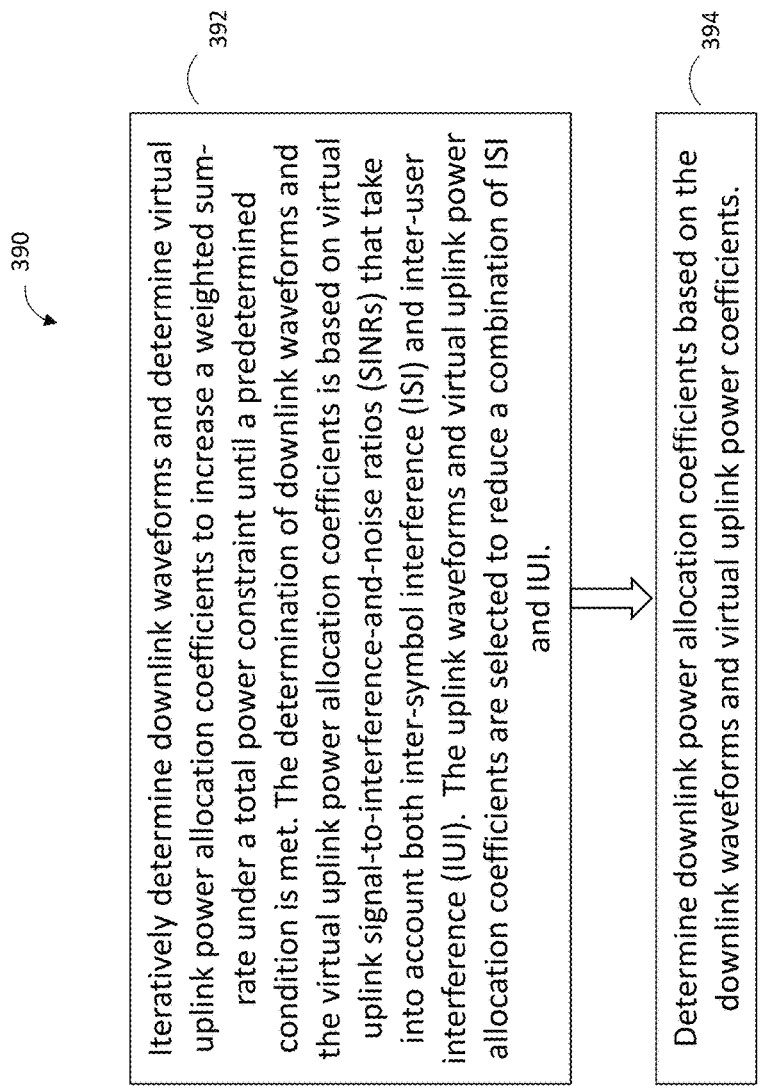
FIG. 10 is a flowchart of an exemplary procedure for communication between a transmitter and multiple receivers using multi-path signals.

FIG. 10 is a flowchart of an exemplary procedure 390 for communication between a transmitter and multiple receivers using multi-path signals. The procedure 390 may be performed by, e.g., the exemplary transmitter 252 of FIG. 6.

According to the procedure 390, a transmitter iteratively determines (392) downlink waveforms and determines virtual uplink power allocation coefficients to increase a weighted sum-rate under a total power constraint until a predetermined condition is met. The determination of downlink waveforms and the virtual uplink power allocation coefficients is based on virtual uplink signal-to-interference-and-noise ratios (SINRs) that take into account both inter-symbol interference (ISI) and inter-user interference (IUI). The uplink waveforms and virtual uplink power allocation coefficients can be selected to reduce a combination of inter-symbol interference and inter-user interference.

Downlink power allocation coefficients are determined (394) based on the downlink waveforms and virtual uplink power allocation coefficients.

Figure 11:
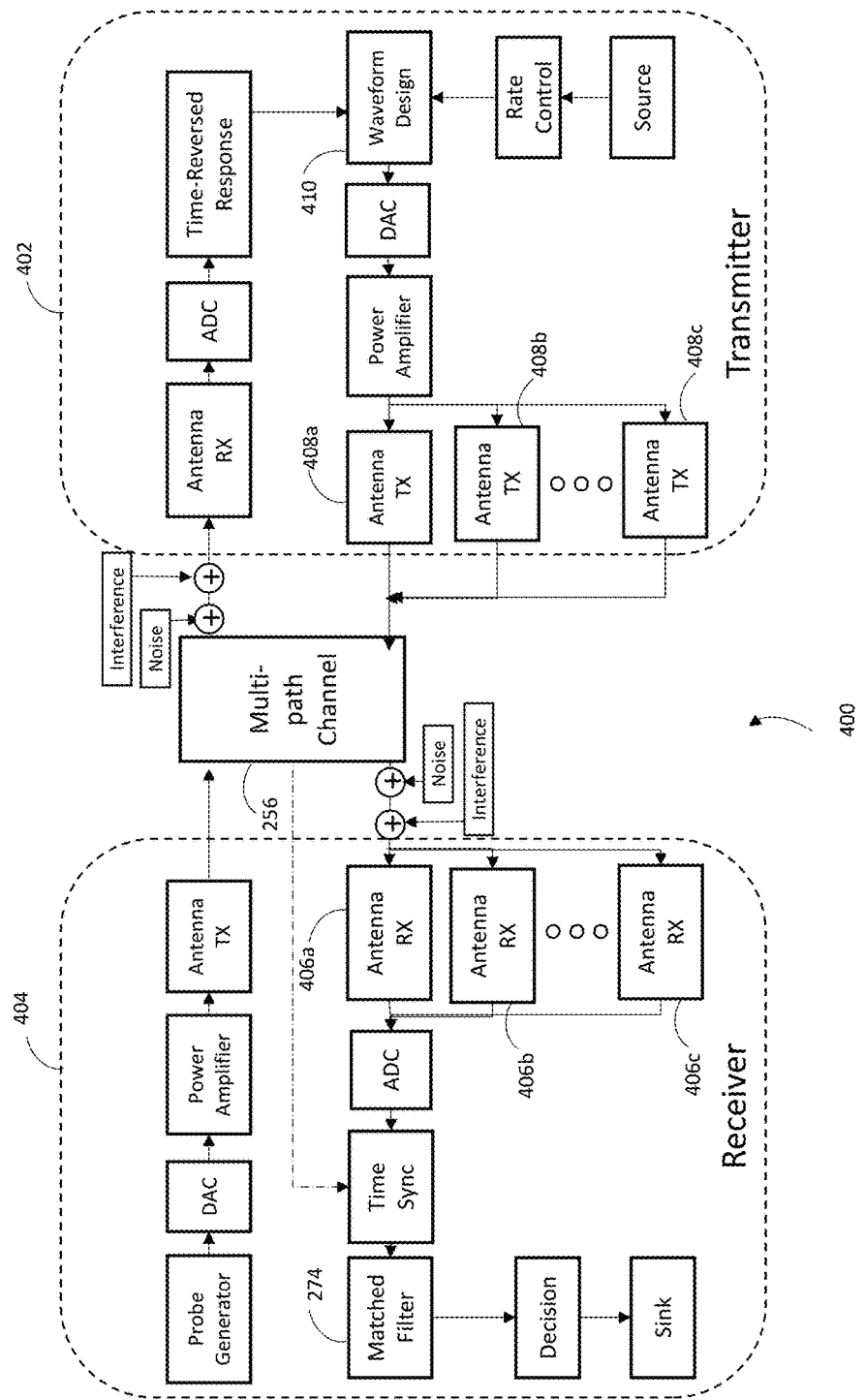
FIG. 11 is a block diagram of an exemplary multiple-input multiple-output (MIMO) time-reversal communication system.

Referring to FIG. 11, in some exemplary embodiments, a MIMO time-reversal communication system 400 includes a transmitter 402 that communicates with receivers 404 through a multi-path channel 256. In this figure, only one receiver is shown. There can be two or more receivers. The system 400 can be used to implement the algorithms described above.

The receiver 404 may include components similar to those of receiver 254 in FIG. 6. The receiver 404 may include multiple receive antennas (e.g., 406a, 406b, 406c, collectively referenced as 406) for receiving multiple data streams simultaneously. The transmitter 402 may include components similar to those of the transmitter 252 in FIG. 6. The transmitter 402 may include multiple transmit antennas (e.g., 408a, 408b, 408c, collectively referenced as 408) for transmitting multiple data streams simultaneously.

A waveform design unit 410 may jointly determine the transmit waveforms of the K users $U=[U_1, \ldots, U_K]$ and power allocation $P=\text{diag}\{P_1, \ldots, P_K\}$ to maximize the weighted sum rate $$\sum_{k=1}^{K} \alpha_k R_k^{DL}$$

subject to a total power constraint $P_{max}$ as described above. The transmit waveforms may be processed and provided to the transmit antennas 408 for transmission to the receivers 404. The waveform design unit 410 may determine the transmit waveforms $U=[U_1, \ldots, U_K]$ and the downlink power allocation coefficients $P=\text{diag}\{P_1, \ldots, P_K\}$ according to the processes described above to reduce (e.g., minimize) the inter-symbol interference and inter-user interference.

Figure 12:
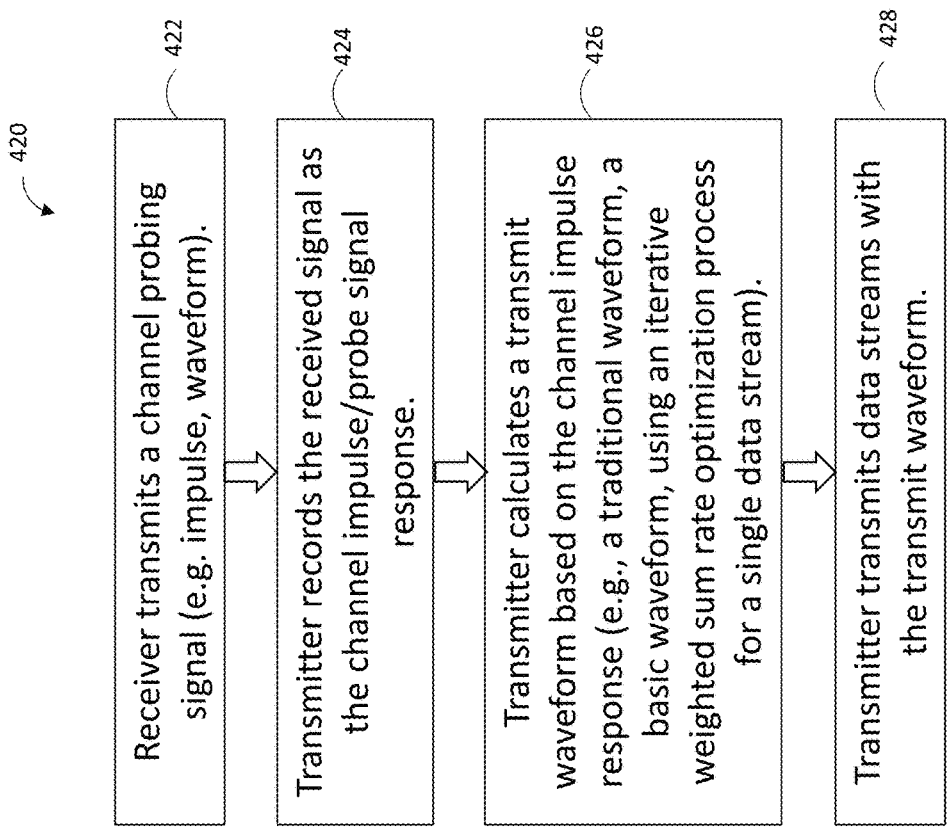
FIG. 12 is a flowchart of an exemplary procedure for operating a MIMO time-reversal communication system.

FIG. 12 is a flowchart of an exemplary procedure 420 for operating a MIMO time-reversal communication system. The procedure 420 may be performed by the exemplary time-reversal communication system 400 of FIG. 11. In this example, the probe signal is an impulse signal, but other probe signal waveforms can also be used.

In procedure 420, a receiver transmits (422) an impulse-like signal. The receiver can be, e.g., the receiver 404 of FIG. 11.

A transmitter records (424) the received signal as the channel impulse response. The transmitter can be, e.g., the transmitter 402 of FIG. 11.

The transmitter calculates (426) the transmit waveform which may be a traditional time-reversal waveform, a basic time-reversal waveform or may be generated using the iterative weighted sum rate optimization process for multiple data streams. The transmitter transmits (428) data streams with the transmit waveforms.

Figure 13:
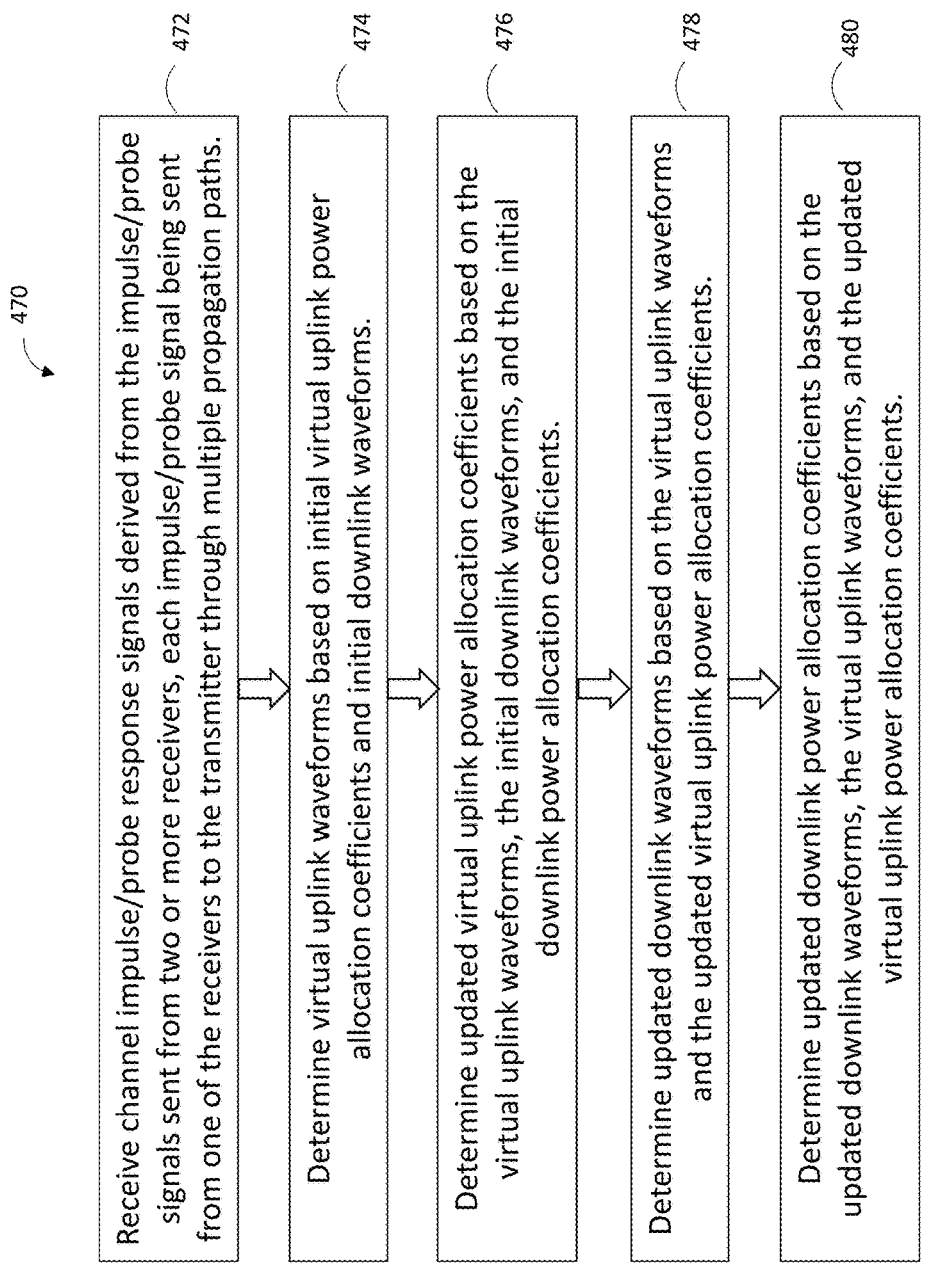
FIG. 13 is a flowchart of an exemplary procedure for implementing iterative sum rate optimization for multiple data streams.

FIG. 13 is a flowchart of an exemplary procedure 470 for implementing iterative sum rate optimization for multiple data streams. The procedure 470 may be performed by, e.g., the exemplary transmitter 402 of FIG. 11. In this example, the probe signal is an impulse signal, but other probe signal waveforms can also be used.

In procedure 470, a transmitter (having multiple transmit antennas) receives (472) channel impulse response signals derived from impulse signals sent from two or more receivers, each impulse signal being sent from one of the receivers to the transmitter through multiple propagation paths.

Virtual uplink waveforms may be determined (474) based on initial virtual uplink power allocation coefficients and initial downlink waveforms.

Updated virtual uplink power allocation coefficients can be determined (476) based on the virtual uplink waveforms, the initial downlink waveforms, and initial downlink power allocation coefficients.

Updated downlink waveforms may be determined (478) based on the virtual uplink waveforms and the updated virtual uplink power allocation coefficients.

Updated downlink power allocation coefficients may be determined (480) based on the updated downlink waveforms, the virtual uplink waveforms, and the updated virtual uplink power allocation coefficients.

Figure 14:
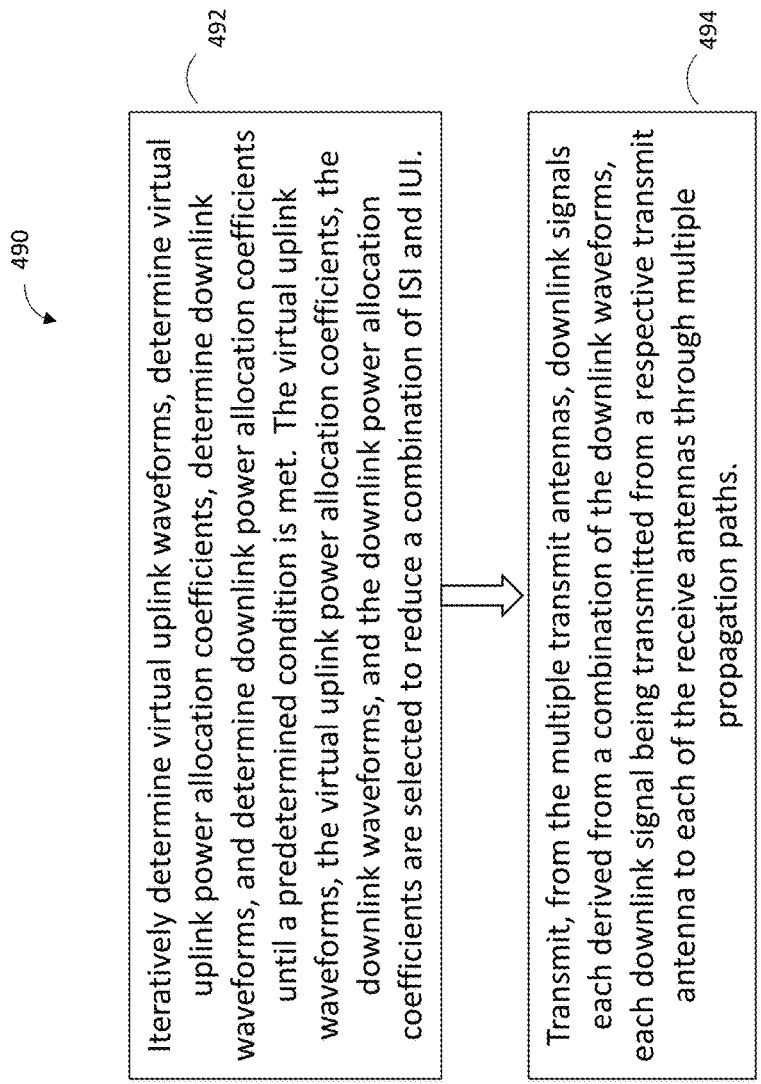
FIG. 14 is a flowchart of an exemplary procedure for communication between a transmitter and multiple receivers using multi-path signals.

FIG. 14 is a flowchart of an exemplary procedure 490 for communication between a transmitter and multiple receivers using multi-path signals, in which the transmitter has multiple transmit antennas, and each receiver has multiple receive antennas. The procedure 490 may be performed by, e.g., the exemplary transmitter 402 of FIG. 11.

In procedure 490, determining virtual uplink waveforms, determining virtual uplink power allocation coefficients, determining downlink waveforms, and determining downlink power allocation coefficients may be iteratively performed (492) until a predetermined condition is met. The virtual uplink waveforms, the virtual uplink power allocation coefficients, the downlink waveforms, and the downlink power allocation coefficients may be selected to reduce a combination of inter-symbol interference and inter-user interference.

Downlink signals are transmitted (494) from multiple transmit antennas. Each downlink signal is derived from a combination of the downlink waveforms, and each downlink signal is transmitted from a respective transmit antenna to each receive antenna through multiple propagation paths.

Hybrid Time-Reversal Systems

Much of the current demand for indoor WiFi wireless services is met by systems that use orthogonal frequency division multi-access (OFDMA). OFDMA and other multi-carrier modulation techniques are attractive because they can provide very high spectral efficiency, i.e., supporting high data rate traffic with signals occupying a relatively narrow portion of the electromagnetic spectrum. These systems can be complex to implement, and this complexity can be reflected in higher priced transmitters and receivers that require a sizeable amount of computing power and may be power hungry. In addition, the density of users that can be reliably supported by a single WiFi wireless access point is relatively small and generally cannot be improved by adding more access points in densely populated areas because the access points may interfere with each other and each other's users.

Time-reversal multi-access technologies (TRDMA) such as those discussed above and in the incorporated references may offer some advantages compared to OFDMA systems and other existing WiFi technologies. These advantages may be accentuated in systems that can support wideband signals, and that suffer from inter-symbol interference and inter-user interference, and/or that require low complexity and/or low power receivers such as may be included in many mobile and computing devices.

Given that WiFi systems employing OFDMA are already widely deployed, in some implementations, TRDMA systems and devices will be included in addition to, alongside, or as underlays to existing WiFi networks/systems and this disclosure describes such hybrid time-reversal systems. In some embodiments, a TRDMA system may operate simultaneously with, but at a different carrier frequency and/or in a different region of the spectrum than, an OFDMA system. In exemplary embodiments, access points and/or wireless terminal devices may include at least some TRDMA-specific circuitry for TRDMA signal transmission and reception and some OFDMA-specific circuitry for OFDMA transmission and reception. In an exemplary embodiment, a circuit including any of an RF antenna, amplifier, A/D converter (ADC), root-raised-cosine (RRC) filter and one-tap detector may be added to, or included in, a device with an existing OFDMA receiver in order for that device to be able to operate as either a TRDMA device, an OFDMA device or both. In some embodiments, concurrent operation of the TRDMA mode of operation and the OFDMA mode of operation may be used to boost the data rate available to the device. In some embodiments, the system may first operate in either the OFDMA or the TRDMA mode, and then turn on the other mode when more bandwidth is requested by the terminal devices.

In some embodiments, a TRDMA system may operate at a similar or the same carrier frequency or region of the spectrum as that of an OFDMA system. In these embodiments, some of the hardware and/or circuitry of OFDMA system can be re-used and/or shared for TRDMA system operation, including, for example, the RF frontend, ADC, and RRC filter. Only minor changes may be needed for a one-tap detector. Given that TRDMA has advantages in wide bandwidth networks, in energy-efficient scenarios, in crowded user spaces, and in environments with rich multi-path scenarios, transmitters and receivers in hybrid systems may be capable of switching their operating modes between implementing/supporting OFDMA (WiFi) and TRDMA protocols to take advantage of the strengths of the different protocols in different operating environments and scenarios. The switching criteria from the OFDMA system to TRDMA system can be when the available spectrum is large, the low-power consumption is needed, or the user density is high. In exemplary embodiments, available spectrum sensing methods can be used to judge whether the available spectrum is wide enough for obtaining at least some of the potential benefits of operating as a TRDMA system. Switching the wireless transmission protocol between OFDMA and TRDMA may be realized by using multiple antennas and processing units in the devices that can be operating simultaneously according to various protocols or that can be switched on and off or between operating certain protocols using known electronic selection techniques. TRDMA capabilities may be added to mobile devices as an after-market feature, for example as TRDMA transmit and/or receive circuits embedded in device sleeves or cases or dongles that may attach physically or wirelessly to designated wireless devices.

In some implementations, the control of hybrid network devices may be manual, mechanical or electronic and may include the use of network and/or performance monitoring equipment in control loops and/or feedback loops. For example, a spectrum sensing circuit in a mobile device may detect the available spectrum, and that measurement can be used to determine if there is sufficient bandwidth available for successful TRDMA operation. In another example, a monitor circuit in a mobile device may detect bit errors in a received signal and may determine that the received SNR is too low for reliable communication using the existing protocol. In that scenario, the mobile device may signal to an access point that its performance is unacceptable and request the access point send its data using a different signaling scheme. If the access point is capable of sending OFDMA and TRDMA signals, for example, the access point may switch from encoding the data on OFDMA waveforms to encoding the data on TRDMA waveforms. Moreover, based on reported Quality of Service (QoS) feedback, the transmitter side can automatically change the modulation scheme as well as a back-off factor when operating as a TRDMA system. Note that although we are discussing a hybrid network that includes OFDMA and TRDMA protocols, this is merely by way of example. In some implementations, hybrid networks may include TRDMA protocols and one, any, or all of wireless transmission standards, formats and protocols including, but not limited to WiFi, 802.11xx, Bluetooth, Bluetooth LE, Zigbee, Near Field Communications (NFC), infrared communications, OFDMA, code division multiple access (CDMA), LTE, 3G, 4G, 5G, and the like Continuing with the example from above, one scenario in which TRDMA has been shown to have superior performance in terms of reduced computational complexity and higher achievable data rates than OFDMA is in wide bandwidth transmission scenarios. For example, TRDMA capabilities can be added to legacy OFDMA networks when more bandwidth becomes available due to changes in regulatory restrictions and/or when improved electronic components support communications at lower power levels and/or wider bandwidths. In some embodiments, it may be possible to simply upgrade the firmware in network access points to support both OFDMA and TRDMA communications. In other embodiments, minimal hardware changes, such as adding or changing out a circuit board that supports faster/wider bandwidth ADCs and DACs, may be utilized to convert traditional OFDMA access points to TRDMA hybrid access points.

In "Time-Reversal Wideband Communications" by Y. Chen et al, in *IEEE Signal Processing Letters*, vol. 20, no. 12, December 2013, it was shown that a TRDMA communication scheme with a bandwidth of 500 MHZ can support higher data rate transmissions than both an LTE system with 20 MHz bandwidth and an LTE-A system with 100 MHz bandwidth. The results comparing both basic and near-optimum TR waveforms to the LTE and LTE-A systems with 1201 subcarriers and calculated for a UWB channel model described in "IEEE 802.15.4a channel model-final report" are shown in FIG. 15A and FIG. 15B.

Figure 15A:
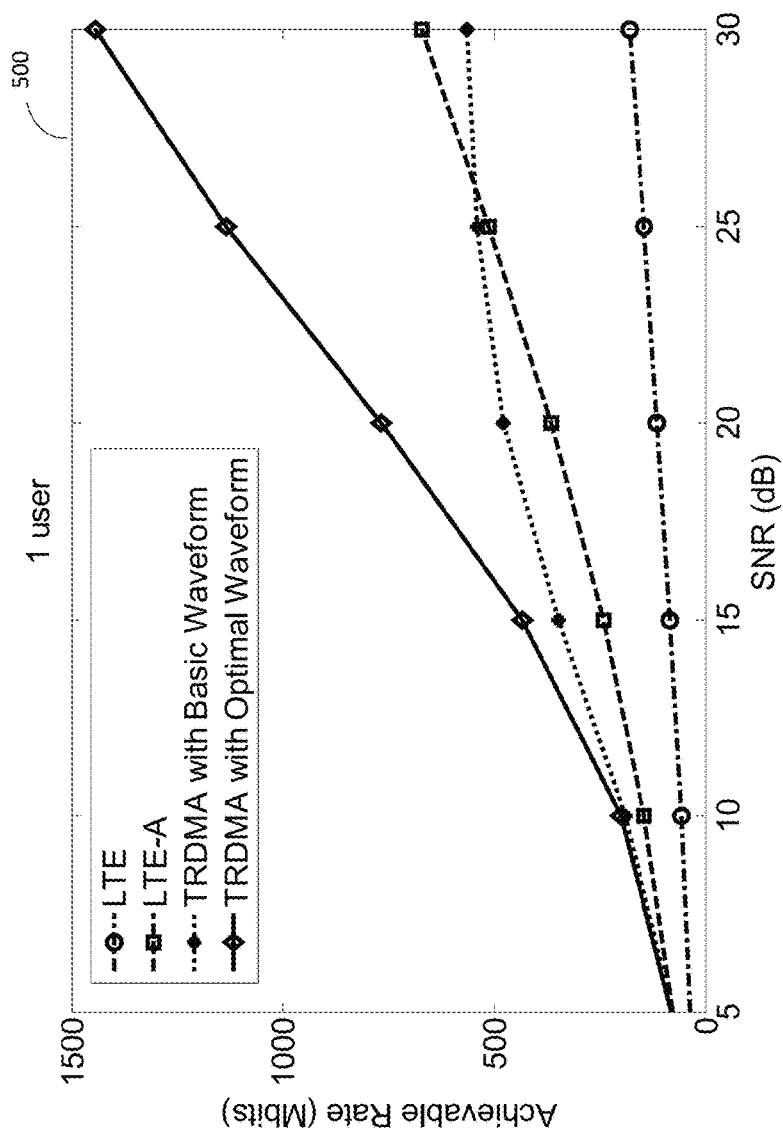
FIG. 15A shows a prediction of the achievable rate for four types of wireless transmission systems that service one (1) user. Two of the transmission systems are 500 MHz bandwidth TRDMA systems, one using a "basic" waveform and the other using a "near-optimal" waveform. The other two transmission systems are OFDM systems: an LTE system with 20 MHz bandwidth and an LTE-A system with 100 MHz bandwidth. The number of subcarriers N in both OFDM systems is set to be 1201, which are chosen from the output of a 2048-point FFT. The channel is modeled using the ultra-wideband channel model proposed in "IEEE 802.15.4a channel model-final report".
Figure 15B:
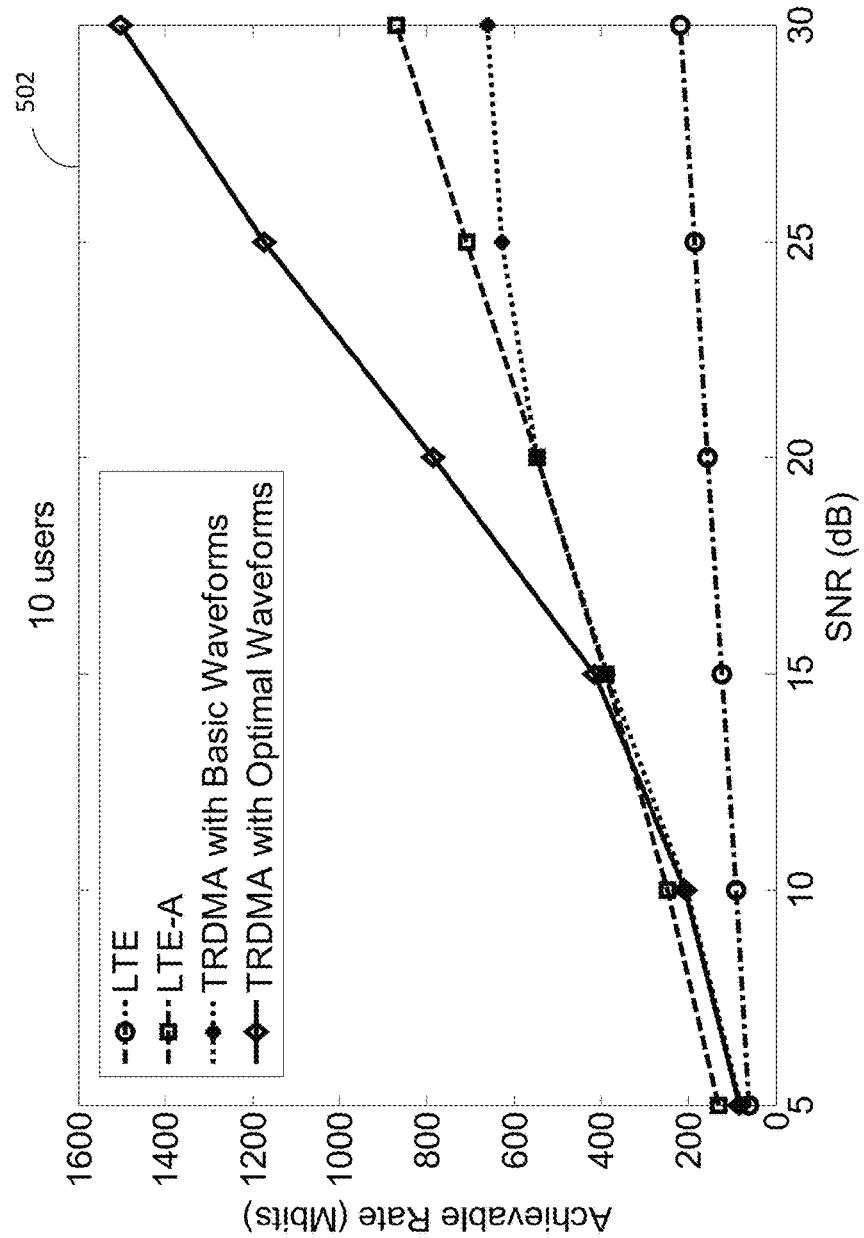
FIG. 15B shows a prediction of the achievable rate for four types of wireless transmission systems that service ten (10) users. Two of the transmission systems are 500 MHz bandwidth TRDMA systems, one using a "basic" waveform and the other using a "near-optimal" waveform. The other two transmission systems are OFDM systems: an LTE system with 20 MHz bandwidth and an LTE-A system with 100 MHz bandwidth. The number of subcarriers N in both OFDM systems is set to be 1201, which are chosen from the output of a 2048-point FFT. The channel is modeled using the ultra-wideband channel model proposed in "IEEE 802.15.4a channel model-final report".

FIG. 15A is a graph 500 that shows even for a single user of the network and a basic TR waveform, the TRDMA scheme can achieve much better performance than LTE in all SNR regions and better performance than LTE-A in most SNR regions. Using a near-optimal TR waveform, the performance of TRDMA can be further improved. FIG. 15B is a graph 502 that shows when there are 10 users, due to the selectivity among different users, the achievable rate of LTE and LTE-A can be enhanced, and the LTE-A can achieve comparable and even slightly better performance than TRDMA with a basic TR waveform. With a near-optimal waveform however, TRDMA can still outperform LTE and LET-A in most SNR regions, which demonstrates that TRDMA can achieve higher throughput than OFDMA systems when the bandwidth is abundant, e.g., 5 times higher in the simulation results shown here.

In a hybrid time-reversal/OFDMA network supporting multiple users and with system and channel parameters as described above, the devices in the network may be arranged to operate using TRDMA waveforms when the SNR is high and to operate using LTE-A signaling when the SNR is low. In this way, the highest achievable data rate for a given SNR can be delivered to users of the system. As described above, switching from one operating mode to another may be accomplished by switching between TRDMA and OFDMA receive modules in the terminal devices for example, and instructing the access point to switch between TRDMA and OFDMA operating modes. In a hybrid system, the access point may always be broadcasting using OFDMA and TRDMA signaling waveforms and the receiver may choose which broadcast to "listen to".

Note that in addition to the increased achievable data rate that can be supported by the TRDMA signaling, the system using TRDMA signaling may also have lower complexity and may be operated efficiently with less complex and less power hungry electronics. For example, Table 510 in FIG. 16 shows a complexity comparison between OFDMA and TRDMA transmitters and receivers for the same parameters modeled in FIG. 15A and reported in the "Time-Reversal Wideband Communications" listed above. Because operating in the TRDMA mode may consume less power compared to operating in the OFDMA mode, an electronic device operating in the TRDMA mode may have a lower operating temperature. In a hybrid TRDMA system, a terminal device may operate in a TRDMA mode and take advantage of the lower complexity to save battery power and/or to operate at a lower temperature or to reduce the operating temperature of components within the device.

Another exemplary hybrid TRDMA system is one that may be used to service various user classes in hierarchical networks such as are serviced in cognitive radio systems. Cognitive radio has been proposed as a method of sharing the spectrum available for wireless communications. In cognitive radio systems, there are generally two classes of users; primary users who are typically licensed users of the bandwidth and who have priority access to that bandwidth, and secondary or unlicensed users, who may access any left-over or available bandwidth as long as they do not cause harmful interference to the primary users. In the cognitive radio systems described to date, secondary users dynamically sense the wireless environment to estimate the activity of the primary users and select the best available bands for communication. Although this method can be effective in some cases, it may be less suitable for others. For example, the demands of sensing and decision making may call for extra circuits or components and consumed power, which may not be available in devices with strict cost and power consumption specifications. Also, since the communication of the secondary user is conditional on the activity of the primary users, secondary user applications that require constant connection to the wired or another wireless network infrastructure may not be supported.

In addition to cognitive radio, an underlay approach using an ultra-wide band (UWB) communication system, which allows simultaneous primary and secondary transmissions as long as the interference level at the primary user side remains acceptable, has been proposed. In such underlay systems, the primary user is only concerned about the interference power, and the secondary user tries to maximize its own utility (for example, throughput, data rate, etc.) under the constraint of the interference power. However, there may be several challenges for previously proposed UWB underlay systems including that inter-symbol interference due to the multi-path effect may necessitate the use of more complicated receivers, and the time-hopping or code-division multi-access methods associated with traditional UWB approaches may increase the implementation difficulty.

TRDMA technology, as described above, and its associated features of time and spatial focusing may be used in an underlay to support one or more user classes in a hierarchical network. In an exemplary hierarchical network with two classes of users, secondary users may use TRDMA signaling, taking advantage of the spatial focusing aspects of the signaling to communicate back and forth with a network access point. That is, secondary users may operate without significantly impacting the primary users because the spatial-focusing effect may concentrate portions of the secondary users' signal energy at the intended secondary receivers thus effectively mitigating the interference to primary users. Another way to understand the advantage is to realize that many more secondary users may be supported by the underlay network before the allowed interference power for the primary user is exceeded. In addition, the temporal focusing capabilities of the TRDMA signal can alleviate at least some of the inter-symbol interference in the wideband TRDMA signal. As described above, this spatial and temporal focusing is realized by taking advantage of the TRDMA waveform and the multiple channel paths to focus at least a portion of the signal energy at the receiver in space and time. Therefore, TRDMA receivers may be less complex, use fewer components, and consume less power than receivers implementing traditional UWB decoding schemes.

In "Interference-Mitigating Broadband Secondary User Downlink System: A Time-Reversal System", in *Proceedings of IEEE Globecom, Cognitive Radio and Networks Symposium*, pp. 884-889, 2013, we investigated a time-reversal based secondary user downlink system and studied the interference on the primary users in an exemplary network. In that study, we identified a virtual primary user that could be shown to suffer the largest impairments owing to the operation of the secondary users, and then studied how many secondary users could be supported by the network, and at what data rates, using either time-reversal signaling or a direct transmission downlink scheme for a given performance impact on the virtual primary user. That study showed that more secondary users could be supported when the secondary users communicated with the access point using TRDMA signaling, than when they communicated using direct transmission, even with idealized receiver characteristics.

Therefore, it is clear that TRDMA may be advantageous in hierarchical networks that support different service levels for users. Note that while we have described a hierarchical network supporting two classes of users, in some implementations the hierarchical networks can support three or more classes of users. In those types of networks, TRDMA may be utilized by any class of users and may provide some degree of performance isolation from transmitters and receivers using other signaling schemes.

Moreover, the users can be further divided into different types even inside the same hierarchical level, e.g., high-rate users and low-rate users. For example, based on different QoS requirements and enabled by the circuitry on the user side, a TRDMA access point can dynamically allocate different bandwidths (either overlapped or non-overlapped) and implement rate control to satisfy the QoS requirement for different types of users.

Figure 17:
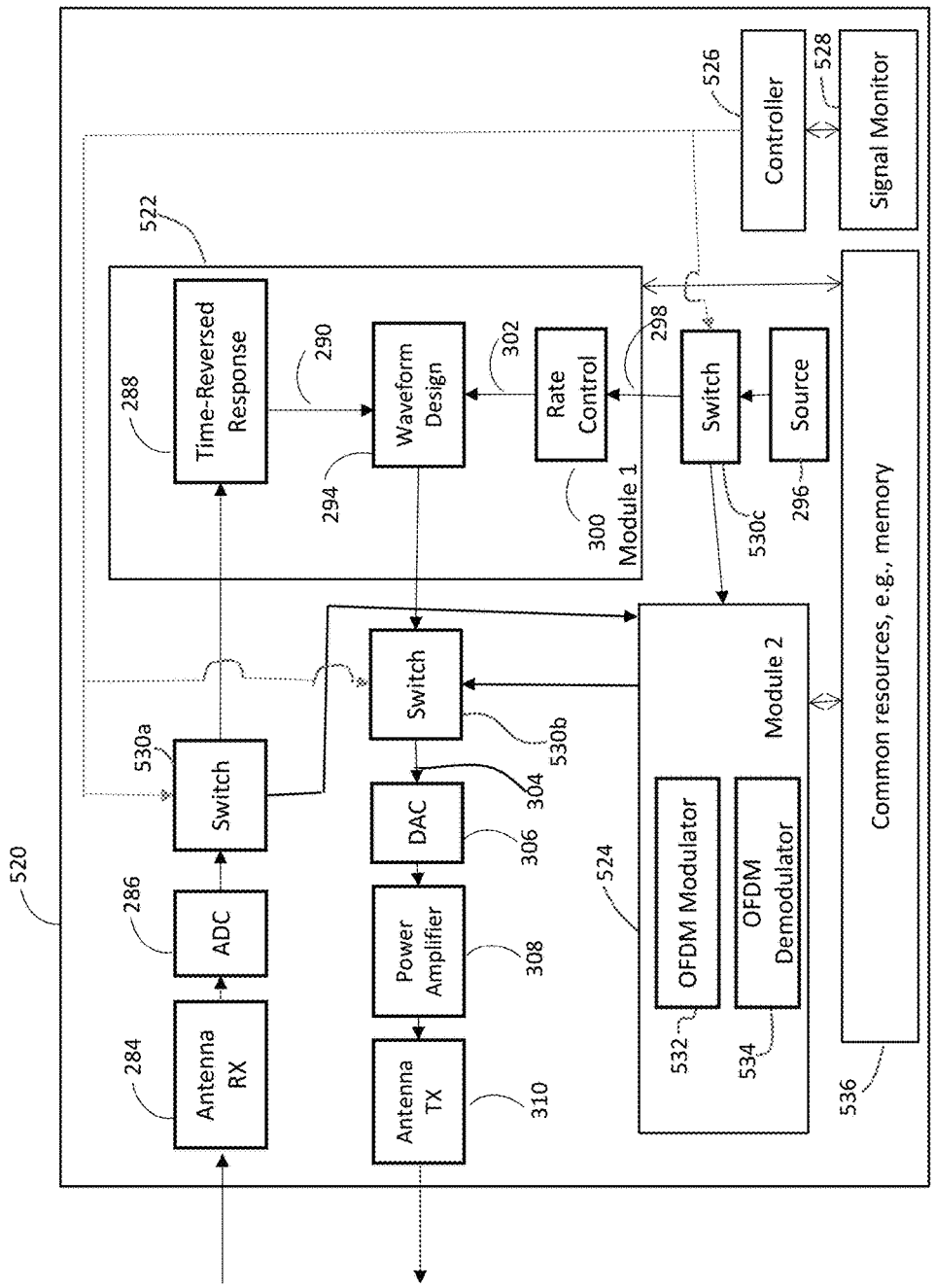
FIGS. 17 and 18 are diagrams of exemplary hybrid time-reversal systems that include a first communication module capable of supporting the TRDMA protocol and a second communication module capable of supporting a second communication protocol.

Referring to FIG. 17, in some implementations, a hybrid time-reversal device 520 includes a first communication module 522 capable of supporting the time-reversal division multi-access (TRDMA) protocol, and a second communication module 524 capable of supporting a second communication protocol, such as the orthogonal frequency division multi-access (OFDMA) protocol. For example, the device 520 can be a wireless network access point. The second communication module 524 includes, e.g., an OFDM modulator 532 and an OFDM demodulator 534. A controller 526 selects one of the first and second communication modules based on information provided by a signal monitor 528. The signal monitor 528 can monitor one or more parameters, e.g., a bit error rate, a portion of an electromagnetic spectrum, a quality of service parameter, or a signal-to-noise ratio. The controller 526 controls switches 530a, 530b, and 530c to select the first or second communication module.

For example, the controller 526 can be configured to select the second communication module 524 to communicate with terminal devices when a higher data rate is required (e.g., when sending image and video data), and to select the first communication module 522 when a lower data rate is needed (e.g., when sending text or numerical data).

For example, the controller 526 can be configured to select the second communication module 524 to communicate with terminal devices when the bit error rate is below a threshold, and select the first communication module 522 when the bit error rate is higher than a threshold.

For example, the controller 526 can be configured to select the second communication module 524 to communicate with terminal devices when the QoS is higher than a threshold, and select the first communication module 522 when the QoS is lower than a threshold.

For example, the controller 526 can be configured to select the second communication module 524 to communicate with terminal devices when the SNR is higher than a threshold, and select the first communication module 522 when the SNR is lower than a threshold.

For example, the controller 526 can be configured to select the second communication module 524 to communicate with terminal devices when the spectrum available to the hybrid time-reversal device 520 is smaller than a threshold, and select the first communication module 522 when the available spectrum is greater than a threshold.

For example, the controller 526 can be configured to select the first or second communication modules based on a combination of two or more criteria described above.

The first and second communication modules 522, 524 can share common resources 536, such as memory, one or more storage devices (e.g., hard drives or flash drives), and power supply.

In the examples given above, the selection of a communication module based on data rate, bit error rate, QoS, SNR, available spectrum and the like may be the reverse of what is stated above. Depending on the protocol implemented in the second communications module and the presence of additional communications modules, the controller may control switches differently in response to signals from the signal monitor.

The controller may also be able to control the device 520 so that both communication modules or some or all of the communication modules in a device are simultaneous operating and communicating with different devices in the network. In some embodiments, a signal monitor may monitor signals from multiple devices and/or multiple network links, and may supply this information to the controller 526.

The examples given above are meant to illustrate some modes of operation of the device 520 in a hybrid network. These examples are not limiting and other implementations and control schemes are within the scope of this invention.

Figure 18:
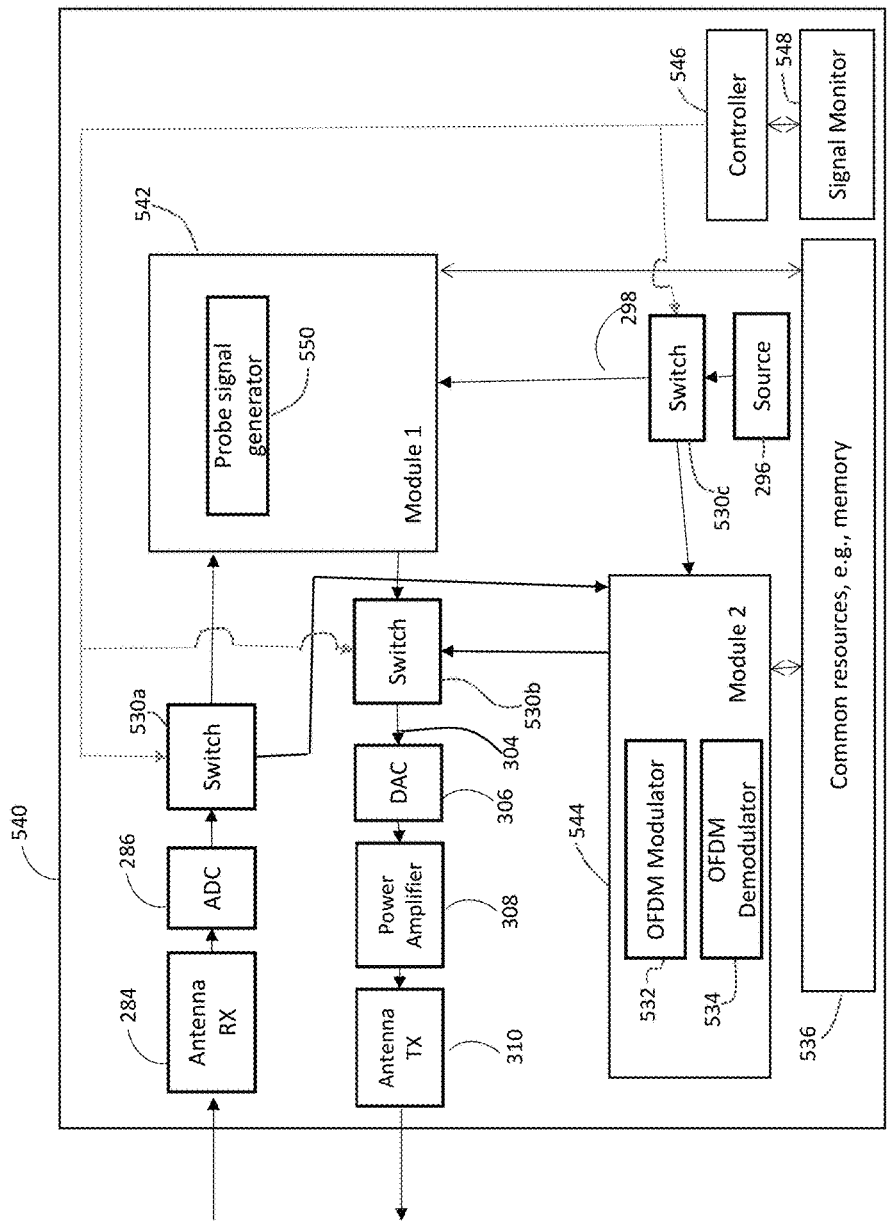

Referring to FIG. 18, in some implementations, a hybrid time-reversal device 540 can include a first communication module 542 capable of supporting the time-reversal division multi-access (TRDMA) protocol, and a second communication module 544 capable of supporting a second communication protocol, such as the orthogonal frequency division multi-access (OFDMA) protocol. For example, the device 540 can be a wireless terminal device. The first communication module 542 can include a probe signal generator 550 that generates a probe signal according to the TRDMA protocol. The second communication module 524 can include, e.g., an OFDM modulator 532 and an OFDM demodulator 534.

In some implementations, a controller 546 selects one of the first and second communication modules based on information provided by a signal monitor 548. The signal monitor 548 can monitor one or more parameters, e.g., a bit error rate, a portion of an electromagnetic spectrum, a quality of service parameter, or a signal-to-noise ratio. The controller 546 controls switches 530a, 530b, and 530c to select the first or second communication module. In some implementations, the controller selects the first or second communication module based on a control signal sent from a remote device, such as a wireless network access point or router.

For example, the controller 546 can be configured to select the second communication module 544 when a higher data rate is required (e.g., when sending image and video data), and to select the first communication module 542 when a lower data rate is needed (e.g., when sending text or numerical data).

For example, the controller 546 can be configured to select the second communication module 544 when the bit error rate is below a threshold, and select the first communication module 542 when the bit error rate is higher than a threshold.

For example, the controller 546 can be configured to select the second communication module 544 when the QoS is higher than a threshold, and select the first communication module 542 when the QoS is lower than a threshold.

For example, the controller 546 can be configured to select the second communication module 544 when the SNR is higher than a threshold, and select the first communication module 542 when the SNR is lower than a threshold.

For example, the controller 546 can be configured to select the second communication module 544 when the spectrum available to the hybrid time-reversal device 540 is smaller than a threshold, and select the first communication module 542 when the available spectrum is greater than a threshold.

For example, the controller 546 can be configured to select the first or second communication modules based on a combination of two or more criteria described above.

The first and second communication modules 542, 544 can share common resources 536, such as memory, one or more storage devices (e.g., hard drives or flash drives), and power supply.

In the examples given above, the selection of a communication module based on data rate, bit error rate, QoS, SNR, available spectrum and the like may be the reverse of what is stated above. Depending on the protocol implemented in the second communications module and the presence of additional communications modules, the controller may control switches differently in response to signals from the signal monitor.

The controller 546 may also be able to control the device 540 so that both communication modules or some or all of the communication modules in a device are simultaneous operating and communicating with different devices in the network. In some embodiments, a signal monitor may monitor signals from multiple devices and/or multiple network links, and may supply this information to the controller 546.

The examples given above are meant to illustrate some modes of operation of the device 540 in a hybrid network. These examples are not limiting and other implementations and control schemes are within the scope of this invention.

Exemplary System Implementation

In some implementations, the transmitter 252 of FIG. 6 or 402 of FIG. 11 can be part of a mobile or stationary device. For example, the transmitter can be implemented as part of a wireless network access point, a sensor module, a mobile phone, a laptop computer, or an electronic appliance that communicates wirelessly with multiple other devices. Here, the wireless network access point refers to a networking hardware device that allows wireless devices to connect to a wired network using one or more communication protocols, such as TRDMA and/or Wi-Fi. For example, a wireless network access point, a mobile phone or a laptop computer may communicate simultaneously with a television, a printer, a thermometer, a radio, a refrigerator, a lighting control system, and other devices using the techniques described above.

The transmitter can include one or more processors and one or more computer-readable mediums (e.g., RAM, ROM, SDRAM, hard disk, optical disk, and flash memory). For example, the one or more processors can implement functions of one or more modules of the transmitter 252 and 402, e.g., the waveform design unit 294 (FIG. 6) and 410 (FIG. 11). The waveform design units 294 and 410 can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, air, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; optical disks, solid state drives and the like. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For example, the transmitter 402 of FIG. 11 can be used to implement the functions of the transmitter 14 of FIG. 6 by using one of the antennas 408. The waveform design unit 410 can be configured to switch between a first mode that implements iterative weighted sum rate optimization for a single data stream, and a second mode that implements iterative weighted sum rate optimization for multiple data streams. U.S. patent application Ser. No. 13/969,271, filed on Aug. 16, 2013, Ser. No. 13/969,320, filed on Aug. 16, 2013, Ser. No. 14/183,648, filed on Feb. 19, 2014, Ser. No. 14/202,651, filed on Mar. 10, 2014, and Ser. No. 14/262,153, filed on Apr. 25, 2014, and PCT application PCT/US2014/051148, filed on Aug. 14, 2014 describe additional examples of systems and processes related to TRDMA wireless networks and are incorporated herein in their entirety by reference.

Accordingly, other embodiments are within the scope of the following claims.

What is claimed is:

1. A wireless network access point, comprising:
   a wireless receiver for receiving a wireless channel probe signal from a device,
   a wireless transmitter capable of supporting a time-reversal division multi-access (TRDMA) protocol based on a first region of a frequency spectrum and at least one other wireless communication protocol based on at least one second region of the frequency spectrum,
      wherein the first region of the frequency spectrum is the same as or similar to each of the at least one second region of the frequency spectrum, and
   a controller that is configured to, for certain periods of time, control the operation of the wireless transmitter to simultaneously support the TRDMA protocol based on the first region of the frequency spectrum and one of the at least one other wireless communication protocol based on one of the at least one second region of the frequency spectrum,
   wherein the transmitter is controlled to support the time-reversal division multi-access protocol for a class of users and the at least one other wireless communication protocol for at least one other class of users simultaneously for the certain periods of time.

2. The access point of claim 1 wherein one of the at least one other wireless communication protocol is an OFDMA protocol.

3. The access point of claim 1 wherein, for certain periods of time, the transmitter is controlled to support one wireless communication protocol at a time.

4. The access point of claim 1 wherein the at least one other wireless communication protocol comprises at least one of: WiFi, 802.11xx, Bluetooth, Bluetooth LE, Zigbee, Near Field Communications (NFC), infrared communications, OFDMA, CDMA, LTE, LTE-A, 3G, 4G, 5G, an UWB communication system, or another TRDMA protocol.

5. The access point of claim 1 further comprising at least one signal monitor in communication with the controller.

6. The access point of claim 5 wherein the at least one signal monitor monitors a bit error rate parameter.

7. The access point of claim 5 wherein the at least one signal monitor monitors a portion of the frequency spectrum comprising the first region and the at least one second region.

8. The access point of claim 5 wherein the at least one signal monitor monitors Quality of Service (QoS) parameter.

9. The access point of claim 5 wherein the at least one signal monitor monitors signal-to-noise ratio (SNR) parameter.

10. The access point of claim 1 wherein at least one wireless terminal device communicates with the wireless network access point using at least one of: the TRDMA protocol and the at least one other wireless communication protocol.

11. A wireless terminal device, comprising:
    a wireless transmitter for transmitting a wireless channel probe signal,
    a wireless receiver capable of supporting a time-reversal division multi-access (TRDMA) protocol based on a first region of a frequency spectrum and at least one other wireless communication protocol based on at least one second region of the frequency spectrum,
       wherein the first region of the frequency spectrum is the same as or similar to each of the at least one second region of the frequency spectrum, and
    a controller that is configured to, for certain periods of time, control the operation of the wireless receiver to simultaneously support the TRDMA protocol based on the first region of the frequency spectrum and one of the at least one other wireless communication protocol based on one of the at least one second region of the frequency spectrum,
    wherein the receiver is controlled to support at least two wireless communication protocols for at least two respective classes of users simultaneously for the certain periods of time.

12. The terminal device of claim 11 wherein one of the at least one other wireless communication protocol is an OFDMA protocol.

13. The terminal device of claim 11 wherein the receiver is controlled to support one wireless communication protocol at a time based on a respective region of the frequency spectrum.

14. The terminal device of claim 11 wherein the at least one other wireless communication protocol comprises at least one of: WiFi, 802.11xx, Bluetooth, Bluetooth LE, Zigbee, Near Field Communications (NFC), infrared communications, OFDMA, CDMA, LTE, LTE-A, 3G, 4G, 5G, an UWB communication system, or another TRDMA protocol.

15. The terminal device of claim 11 further comprising at least one signal monitor in communication with the controller.

16. The terminal device of claim 15 wherein the at least one signal monitor monitors a bit error rate parameter.

17. The terminal device of claim 15 wherein the at least one signal monitor monitors a portion of the frequency spectrum comprising the first region and the at least one second region.

18. The terminal device of claim 15 wherein the at least one signal monitor monitors a Quality of Service (QoS) parameter.

19. The terminal device of claim 15 wherein the at least one signal monitor monitors a signal-to-noise ratio (SNR) parameter.

20. The terminal device of claim 11 wherein at least one wireless access point communicates with the wireless terminal device using at least one of: the TRDMA protocol and the at least one other wireless communication protocol.

* * * * *